United States Patent
Frick et al.

(10) Patent No.: US 9,296,931 B2
(45) Date of Patent: Mar. 29, 2016

(54) TWO-COMPONENT STRUCTURAL ADHESIVE WHICH IS IMPACT RESISTANT AT ROOM TEMPERATURE

(75) Inventors: Karsten Frick, Remetschwil (CH); Jürgen Finter, Zürich (CH); Andreas Kramer, Zürich (CH); Ulrich Gerber, Uitikon-Waldegg (CH)

(73) Assignee: SIKA TECHNOLOGY AG, Baar (CH)

( * ) Notice: Subject to any disclaimer, the term of this patent is extended or adjusted under 35 U.S.C. 154(b) by 729 days.

(21) Appl. No.: 13/601,280

(22) Filed: Aug. 31, 2012

(65) Prior Publication Data

US 2013/0230726 A1 Sep. 5, 2013

Related U.S. Application Data

(63) Continuation of application No. PCT/EP2011/052972, filed on Mar. 1, 2011.

(30) Foreign Application Priority Data

Mar. 2, 2010 (EP) .................................... 10155205

(51) Int. Cl.
| | |
|---|---|
| C09J 163/00 | (2006.01) |
| C08G 59/54 | (2006.01) |
| C08L 63/00 | (2006.01) |
| C08L 19/00 | (2006.01) |
| C08L 75/00 | (2006.01) |

(52) U.S. Cl.
CPC ............... *C09J 163/00* (2013.01); *C08G 59/54* (2013.01); *C08L 63/00* (2013.01); *C08L 19/006* (2013.01); *C08L 75/00* (2013.01); *Y10T 428/31515* (2015.04)

(58) Field of Classification Search
CPC ............................... C08L 63/00; C09J 163/00
USPC ......................................................... 428/414
See application file for complete search history.

(56) References Cited

U.S. PATENT DOCUMENTS

| | | | |
|---|---|---|---|
| 4,447,579 | A | 5/1984 | Takagi et al. |
| 4,578,424 | A | 3/1986 | Goel |
| 4,803,232 | A | 2/1989 | Shah |
| 5,019,608 | A | 5/1991 | Shah |
| 5,232,996 | A | 8/1993 | Shah et al. |
| 6,322,890 | B1 | 11/2001 | Barron et al. |
| 6,645,341 | B1 | 11/2003 | Gordon |
| 2002/0164485 | A1* | 11/2002 | Martin ........................... 428/413 |
| 2003/0121606 | A1 | 7/2003 | Damico et al. |
| 2005/0070634 | A1 | 3/2005 | Lutz et al. |
| 2009/0048370 | A1 | 2/2009 | Lutz et al. |
| 2009/0264558 | A1 | 10/2009 | Kramer et al. |
| 2009/0324958 | A1 | 12/2009 | Schulenburg et al. |
| 2010/0273005 | A1* | 10/2010 | Kramer et al. ................. 428/414 |
| 2010/0280167 | A1 | 11/2010 | Frick et al. |
| 2011/0030893 | A1 | 2/2011 | Kramer et al. |
| 2013/0037213 | A1* | 2/2013 | Frick et al. ..................... 156/330 |

FOREIGN PATENT DOCUMENTS

| | | |
|---|---|---|
| EP | 0 301 720 A2 | 2/1989 |
| EP | 1 146 061 A1 | 10/2001 |
| EP | 1 876 194 A1 | 1/2008 |
| EP | 1 916 269 A1 | 4/2008 |
| EP | 2 062 928 A1 | 5/2009 |
| EP | 2 110 397 A1 | 10/2009 |
| WO | WO 03/042316 A1 | 5/2003 |
| WO | WO 2005/097893 A1 | 10/2005 |
| WO | WO 2006/052725 A1 | 5/2006 |
| WO | WO 2006/052726 A1 | 5/2006 |
| WO | WO 2006/052727 A1 | 5/2006 |
| WO | WO 2006/052728 A1 | 5/2006 |
| WO | WO 2006/052729 A1 | 5/2006 |
| WO | WO 2006/052730 A1 | 5/2006 |
| WO | WO 2009/025991 A1 | 2/2009 |

OTHER PUBLICATIONS

Oprea, S., "Synthesis and Characterization of Polyurethane Urea Acrylates: Effects of the Hard Segments Structure", Journal of Applied Polymer Science, 2007, vol. 105, pp. 2509-2515.*
Notification of Transmittal of Translation of the International Preliminary Report on Patentability (Forms PCT/IB/338 and PCT/IB/373) and the Written Opinion of the International Searching Authority (Form PCT/ISA/237) dated Oct. 4, 2012, issued in corresponding International Application No. PCT/EP2011/052972. (23 pages).
International Search Report (PCT/ISA/210) issued on May 31, 2012, by the European Patent Office as the International Searching Authority for International Application No. PCT/EP2011/052972.

* cited by examiner

*Primary Examiner* — Megan McCulley
(74) *Attorney, Agent, or Firm* — Buchanan Ingersoll & Rooney PC

(57) ABSTRACT

The disclosure relates to the field of two-component epoxy resin compositions and to the use thereof as a repair adhesive, in particular in vehicle manufacturing. The two-component epoxy resin compositions according to the disclosure contain a curing component K2, which comprises between 1 and 10 wt. % of an amino group-terminated polyamide B, together with an epoxy resin component K1. The compositions show that the impact resistance is highly increased while an acceptable sheer strength is simultaneously retained.

19 Claims, No Drawings

TWO-COMPONENT STRUCTURAL ADHESIVE WHICH IS IMPACT RESISTANT AT ROOM TEMPERATURE

RELATED APPLICATION(S)

This application claims priority as a continuation application under 35 U.S.C. §120 to PCT/EP2011/052972, which was filed as an International Application on Mar. 1, 2011 designating the U.S., and which claims priority to European Application No. 10155205.7 filed in Europe on Mar. 2, 2010. The entire contents of these applications are hereby incorporated by reference in their entireties.

FIELD

The disclosure relates to the field of two-component epoxy resin compositions and to the use thereof as a repair adhesive, in particular in vehicle manufacturing.

BACKGROUND INFORMATION

High-quality adhesives are increasingly used in the manufacture of vehicles and attachments or also of machines and devices instead of or in combination with conventional joining methods such as screws and bolts, rivets, punching, or welding. When adhesively bonding structural parts, high strength and impact strength of the adhesive are of prime importance.

In vehicle manufacture and in the field of vehicle repair, thermosetting adhesives, which are usually cured at temperatures above 60° C. and sometimes up to 170° C., have established themselves. However, their use is often disadvantageous, for example in the repair of vehicles in repair shops where the equipment required for heat curing is not available. Moreover, the repair of vehicles—contrary to the manufacture thereof—is carried out on fully equipped vehicles so that heat-sensitive materials could be affected.

Consequently, adhesives which can already be cured at room temperature, in particular two-component epoxy resin adhesives, gain in importance. However, these often do not have the same mechanical properties as the thermosetting adhesives, which offers potential for further improvements.

In general, epoxy adhesives are characterized by high mechanical strength, in particular high tensile strength. However, conventional epoxy adhesives are in most cases too brittle when subjecting the adhesive joint formed therefrom to an impact loading and are thus far from meeting the requirements in particular of the automotive industry under crash conditions involving both high tensile and peel stresses. In this regard, the strengths at high, but in particular also at low temperatures below −10° C. are insufficient.

By using various methods, it has been tried to improve the impact strength of epoxy adhesives.

According to the literature, essentially two methods for reducing the brittleness of epoxy adhesives and thus improving the impact strength have been proposed: on the one hand, the objective can be achieved by additions of at least partially cross-linked high-molecular compounds such as latices of core/shell polymers or other flexibilizing polymers and copolymers. On the other hand, a certain increase in toughness can be achieved by introducing soft segments, for example, by modifying the epoxy components as required.

WO 2009/025991 A1 describes epoxy resin adhesives for use in vehicle manufacture that cure at relatively low temperatures. The structural adhesives disclosed there have three main components, namely from 15 to 50% by weight of a primary or secondary amino group terminated polyether, from 4 to 40% by weight of a primary or secondary amino group terminated rubber, and from 10 to 30% by weight of a primary or secondary amino group terminated polyamide having a melting temperature not exceeding 50° C. Moreover, this composition additionally contains at least one impact strength modifier.

However, the described two-component epoxy resin compositions have room for improvement in terms of impact strength.

SUMMARY

Accordingly, it is the object of the present disclosure to provide new epoxy resin compositions which enable to increase impact strength while simultaneously retaining an acceptable tensile sheer strength.

Surprisingly, it has been found that the novel two-component epoxy resin compositions according to the present disclosure overcome the drawbacks of the state of the art.

The epoxy resin compositions are in particular suitable for vehicle manufacturing where adhesive joints are required to maintain their integrity even under high mechanical loads, e.g., in the event of an accident.

Other aspects of the present disclosure will be described below.

DETAILED DESCRIPTION

The disclosure relates to the field of two-component epoxy resin compositions and to the use thereof as a repair adhesive, in particular in vehicle manufacturing.

In a first aspect, the present disclosure pertains to a two-component epoxy resin composition containing
one epoxy resin component K1 comprising at least one epoxy resin A that contains on average more than one epoxy group per molecule;
and
one hardener component K2 comprising between 1 and 10% by weight, preferably 4 and 8% by weight, based on the total weight of the hardener component, of the amino group-terminated polyamide B;
wherein at least one of components K1, K2 contains at least one impact strength modifier C.

In this entire text, the prefix "poly" in "polyamide", "polyisocyanate," "polyol," or "polyphenol," for example, indicates molecules that formally contain two or more of the respective functional groups.

"Impact strength modifier" in the present disclosure means an additive to a epoxy resin matrix that, even for small additions, in particular additions of 0.1-35% by weight, preferably 0.5-15% by weight, causes a definite increase in toughness of the cured matrix, and thus higher bending, tensile, shock, or impact stresses can be withstood before the matrix cracks or fractures. Typically, the impact peel strength according to ISO 11343 is used as a measure of the impact strength. Here, the fracture energy (BE) is indicated as the area under the measurement curve (from 25% to 90%, according to ISO 11343). Typically, the impact peel strength according to ISO 11343 can be used as another measure of the impact strength.

The term "polymer" as used in the present disclosure, on the one hand, refers to a collective of chemically uniform macromolecules prepared by a polyreaction (polymerization, polyaddition, polycondensation) where, however, the macromolecules differ with respect to their degree of polymerization, molecular weight and chain length. On the other hand, the term also comprises derivatives of said collective of macromolecules resulting from polyreactions, that is, compounds which were obtained by reactions such as, e.g., additions or substitutions, of functional groups in predetermined macromolecules and which may be chemically uniform or chemically non-uniform. Moreover, the term also comprises so-called prepolymers, that is, reactive organic pre-adducts, the functional groups of which participate in the formation of macromolecules.

In the present disclosure, the use of the term "independently of one another" in connection with substituents, moieties or groups should be interpreted such that substituents, moieties or groups with the same designation may be present simultaneously in the same molecule with different definitions.

The epoxy resin A in the epoxy resin component K1 that contains on average more than one epoxy group per molecule is preferably a liquid epoxy resin or a solid epoxy resin. The term "solid epoxy resin" is very well known to a person skilled in the art of epoxies and is used in contrast to "liquid epoxy resins". The glass transition temperature of solid resins is above room temperature, i.e. they can be comminuted to free-flowing powders at room temperature.

Preferred solid epoxy resins have the formula (IX)

Araldite® GY 250, Araldite® PY 304, Araldite® GY 282 (Huntsman), or D.E.R.™ 331, or D.E.R.™ 330 (Dow), or Epikote 828 (Hexion).

Moreover, so-called Novolacs A are suitable epoxy resins. These have in particular the following formula:

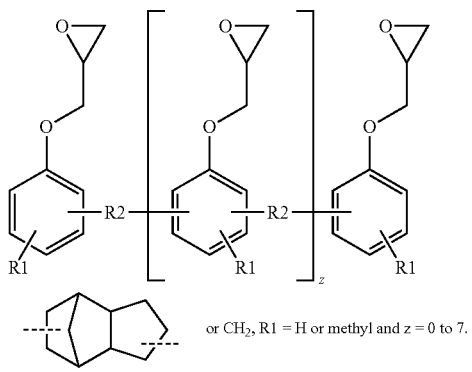

with R2 = [dicyclopentadienyl structure] or $CH_2$, R1 = H or methyl and z = 0 to 7.

In particular, they are phenol or cresol novolacs (R2=$CH_2$).

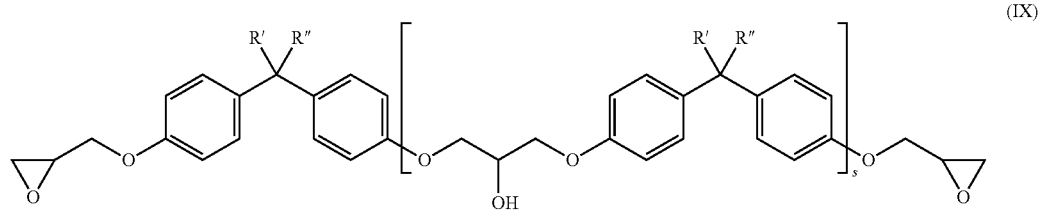

(IX)

In this formula, the substituents R' and R" are each independently of one another H or $CH_3$. In addition, the index s has a value of >1.5, in particular of 2 to 12.

Such solid epoxy resins are commercially available, for example from Dow, Huntsman or Hexion.

Compounds of the formula (IX) with an index s between 1 and 1.5 are referred to by a person skilled in the art as semi-solid epoxy resins. For this present disclosure, they are likewise considered to be solid resins. However, preferred are epoxy resins in the narrower sense, i.e. the index s has a value of >1.5.

Preferred liquid epoxy resins have the formula (X)

Such epoxy resins are commercially available under the trade names EPN or ECN as well as Tactix®556 from Huntsman or under the product line D.E.N.™ from Dow Chemical.

Preferably, the epoxy resin A is a liquid epoxy resin of the formula (X). In an even more exemplary embodiment, the thermosetting epoxy resin composition contains at least one liquid epoxy resin of formula (X) as well as at least one solid epoxy resin of formula (IX).

The proportion of epoxy resin A is preferably 10-85% by weight, in particular 15-70% by weight, preferably 15-60% by weight, based on the weight of the composition.

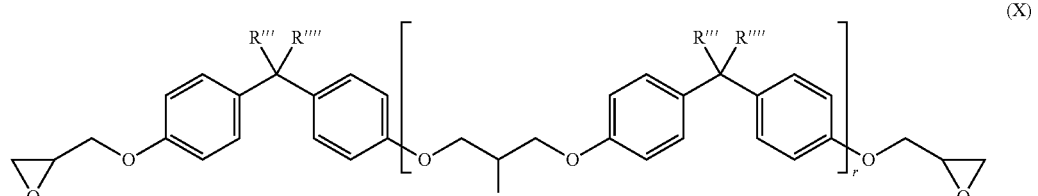

(X)

In this formula, the substituents R''' and R'''' are each independently of one another H or $CH_3$. In addition, the index r has a value of 0 to 1. Preferably, r has a value of less than 0.2.

These are thus preferably diglycidyl ethers of bisphenol A (DGEBA), of bisphenol F and of bisphenol A/F (here, the designation "A/F" refers to a mixture of acetone with formaldehyde which is used as the reactant in the preparation thereof). Such liquid resins are available, for example, as The composition according to the disclosure additionally contains at least one hardener component K2 for epoxy resins. This hardener is preferably a compound selected from the group consisting of poly(ethyleneimines), polyamidoamines, amino group terminated butadiene/acrylonitrile copolymers and polyamines.

Polyamines are in particular polyoxyalkylenediamines having molecular weights of less than 500 g/mol (Jeffamine®

D-230, Jeffamine D400, Jeffamine® EDR-148), 4,7,10-tri-oxamidecane-1-13-diamine, 4,9-dioxadodecane-1,12-diamines, ethylendiamine, and/or 3(4),8(9)-bis(aminomethyl)tricyclo[5.2.1.0$^{2,6}$]decane (TCD-Diamin®, manufactured by Celanese Chemicals).

In one embodiment, the hardener component K2 additionally contains up to 20% by weight, based on the weight of the hardener component, poly(ethyleneimines).

The hardener component K2 comprises between 1-10% by weight, preferably 4-8% by weight, based on the total weight of the hardener component, of the amino group-terminated polyamide B. The range between 1-10% does not comprise the respective extreme values, i.e., 1 and 10% by weight. It has been found that in particular the impact strength of the cured adhesive significantly decreases if this proportion is exceeded. Already above a proportion of 8% by weight of the amino group-terminated polyamide B, the impact strength of the adhesive composition significantly decreases under all chosen test conditions. Thus, it has been found that the impact strength both at 0° C., 23° C. (after 7 days, respectively) and 60° C. (after 2 hours, respectively) significantly decreased if the adhesive composition contained more than 8, in particular more than or equal to 10% by weight of polyamide.

Although the increase of impact strength was associated with a slight relative decrease of the tensile sheer strength, on the whole, however, two-component adhesive compositions having distinctly improved total properties could be provided in the examples described here.

Preferably, the amino group-terminated polyamide B is a primary or secondary amino group-terminated polyamide.

The polyamide preferably contains on average at least 1.5, especially preferably at least 1.8 and most preferably at least 2.0 primary or secondary amino groups per molecule. A typical example are 2-3 primary or secondary amino groups per molecule, however, also 6 or more primary or secondary amino groups per molecule are conceivable.

An especially preferred polyamide is a reaction product of a dimerized fatty acid and a polyamine. Examples of such polyamides include those obtainable under the trade names Versamid® 115, Versamid® 125, and Versamid® 140 from the company Cognis.

In one embodiment, the composition contains as impact strength modifier C an amino group-terminated impact strength modifier C1 obtained by the reaction of a polyurethane prepolymer having isocyanate groups, a primary diamine, and optionally at least one Michael acceptor, where the polyurethane prepolymer having isocyanate groups is prepared from at least one polyisocyanate and at least one polyester or polyether polyol having at least two hydroxyl groups and said impact strength modifier is a component of the hardener component K2, in particular in an amount of 1 to 30% by weight, based on the weight of the hardener component K2.

In particular, the diamine is selected from the group consisting of aliphatic diamines containing ether groups, in particular polyoxyalkylenediamines; in particular polyoxyethylenediamines, polyoxypropylenediamines; polyoxybutylenediamines, amino group terminated polybutadienes and butadiene/acrylonitrile copolymers or a mixture thereof.

In particular, these are polyoxyalkylene polyamines having two amino groups such as are commercially available, for example, under the name Jeffamine® (from Huntsman Chemicals), under the name Polyetheramin (from BASF) or under the name PC Amine® (from Nitroil) and mixtures of the above-mentioned polyamines.

Preferred diamines are polyoxyalkylene polyamines having two amino groups, especially those of the formula (VIIIa).

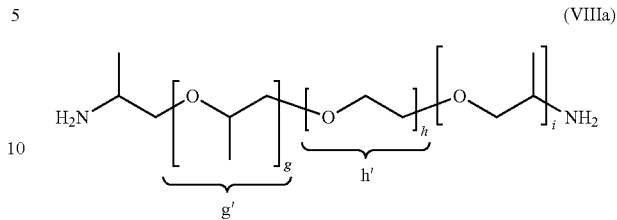

(VIIIa)

Here, g' represents the structural element derived from propylene oxide and h' represents the structural element derived from ethylene oxide. Moreover, g, h, and i each represent values of from 0 to 40 provided that the sum of g, h, and i≥1. In particular, molecular weights between 100 and 4,000 g/mol are preferred.

Particularly preferred diamines are Jeffamine® offered by Huntsman Chemicals under the D line and the ED line, such as, for example, Jeffamine® D-230, Jeffamine® D-400, Jeffamine® D-2000, Jeffamine® D-4000, Jeffamine® ED-600, Jeffamine® ED-900, or Jeffamine® ED-2003.

According to the disclosure, the impact strength modifier C1 can be prepared by several reaction routes, which means that the amino group terminated polyurethane and/or the primary diamine and/or the polyurethane prepolymer having isocyanate groups reacted with the diamine are reacted with the Michael acceptor.

Hence, in one embodiment the amino group terminated impact strength modifier may be terminated with secondary amino groups and result from reacting an amino group terminated impact strength modifier with primary amino groups and a Michael acceptor.

In one embodiment, the impact strength modifier C1 used according to the disclosure is wherein in addition to the at least one polyether or polyester polyol at least one polymer $Q_{PM}$ having terminal amino, thiol or hydroxyl groups and/or at least one optionally substituted polyphenol $Q_{PP}$ can be used for preparing the polyurethane prepolymer.

Suitable polymers $Q_{PM}$ having terminal amino, thiol or hydroxyl groups are in particular polymers $Q_{PM}$ having two or three terminal amino, thiol or hydroxyl groups.

Preferably, the polymers $Q_{PM}$ have equivalent weights of 300-6,000, in particular 600-4,000, preferably 700-2,200 g/equivalent of NCO-reactive groups.

Suitable polymers $Q_{PM}$ are polyols, e.g., the following commercial polyols or any mixture thereof:

Polyoxyalkylene polyols, also called polyether polyols or oligoetherols, which are polymerization products of ethylene oxide, 1,2-propylene oxide, 1,2- or 2,3-butylene oxide, oxetane, tetrahydrofuran or mixtures thereof, optionally polymerized using a starter molecule with two or more active hydrogen atoms such as, for example, water, ammonia or compounds with several OH or NH groups, such as, for example, 1,2-ethanediol, 1,2- and 1,3-propanediol, neopentylglycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, as well as mixtures of the above-mentioned compounds. Both polyoxyalkylene polyols with a low degree of unsaturation (measured according to ASTM D-2849-69 and indicated in milliequivalents of unsaturation per gram of polyol (mEq/g)) and being produced, for example, using so-called double-metal cyanide complex catalysts (DMC catalysts) as well as polyoxyalkylene polyols having a higher degree of unsaturation and, being produced, for example, using anionic catalysts, such as NaOH, KOH, CsOH, or alkali alcoholates, can be used.

Especially preferred are polyoxyalkylene diols or polyoxyalkylene triols, in particular polyoxypropylene diols or polyoxypropylene triols.

Polyoxyalkylene diols and triols with a degree of unsaturation that is less than 0.02 mEq/g and with a molecular weight in the range of 1,000-30,000 g/mol, as well as polyoxypropylene diols and triols with a molecular weight of 400-8,000 g/mol are especially suitable.

So-called ethylene oxide-terminated ("EO-endcapped," ethylene oxide-endcapped) polyoxypropylene polyols are suitable as well. The latter are special polyoxypropylene polyoxyethylene polyols which can be obtained, for example, in that pure polyoxypropylene polyols, in particular polyoxypropylene diols and -triols, after the polypropoxylation reaction with ethylene oxide is concluded, are further alkoxylated and as a result have primary hydroxyl groups.

Moreover, exemplary compounds are:

hydroxy terminated polybutadiene polyols, such as, for example, those prepared by polymerizing 1,3-butadiene and allyl alcohol or by oxidizing polybutadiene, and also their hydrogenation products;

polyether polyols grafted with styrene-acrylonitrile or acrylonitrile-methylmethacrylate, in particular those supplied, e.g., by Elastogran under the name Lupranol®;

polyester polyols, also called oligoesterols, which are prepared from di- to trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols with organic dicarboxylic acids or their anhydrides or esters such as, for example, succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid, or mixtures of the aforementioned acids, and polyester polyols from lactones such as ε-caprolactone, for example.

polycarbonate polyols available by reacting, for example, the above-mentioned alcohols used for the formation of polyester polyols with dialkyl carbonates, diaryl carbonates or phosgene.

polyacrylate and polymethacrylate polyols.

Polyhydroxy-functional fats and oils, for example natural fats and oils, in particular castor oil; or polyols—so-called oleochemical polyols—obtained by chemical modification of natural fats and oils, for example the epoxy polyesters or epoxy polyethers obtained by epoxidation of unsaturated oils and subsequent ring opening with carboxylic acids or alcohols, or polyols obtained by hydroformylation and hydrogenation of unsaturated oils; or polyols obtained from natural fats and oils by degradation processes such as alcoholysis or ozonolysis and subsequent chemical cross-linking, for example by re-esterification or dimerization of the thus obtained degradation products or derivatives thereof. Suitable degradation products of natural fats and oils are in particular fatty acids and fatty alcohols as well as fatty acid esters, for example, the methyl esters (FAME) that can be derivatized, for example, by hydroformylation and hydrogenation to form hydroxy fatty acid esters.

Polyhydrocarbon polyols, also called oligohydrocarbonols, such as, for example, polyhydroxy functional ethylene-propylene, ethylene-butylene, or ethylene-propylene-diene copolymers, such as, for example, are manufactured by the company Kraton Polymers, or polyhydroxy-functional copolymers derived from dienes such as 1,3-butanediene or diene mixtures and vinyl monomers such as styrene, acrylonitrile, or isobutylene, or polyhydroxy functional polybutadiene polyols such as, for example, those that are prepared by copolymerization of 1,3-butadiene and allyl alcohol and can also be hydrogenated.

Polyhydroxy terminated acrylonitrile-butadiene copolymers, such as can be synthesized, for example, from epoxies or amino alcohols and carboxyl terminated acrylonitrile-butadiene copolymers (commercially available under the name Hypro™ (formerly Hycar®) CTBN and CTBNX from Nanoresins AG, Germany, or Emerald Performance Materials LLC).

amphiphilic block copolymer having at least one hydroxyl group.

In the present disclosure, amphiphilic block copolymer having at least one hydroxyl group means a copolymer which contains at least one block segment miscible with epoxy resin and at least one block segment immiscible with epoxy resin. In particular, amphiphilic block copolymers are those disclosed in WO 2006/052725 A1, WO 2006/052726 A1, WO 2006/052727 A1, WO 2006/052728A1, WO 2006/052729 A1, WO 2006/052730 A1, WO 2005/097893 A1, the contents of which is hereby incorporated by reference.

Examples of block segments miscible with epoxy resin are in particular polyethylene oxide, polypropylene oxide, poly(ethylene oxide-co-propylene oxide) and poly(ethylene oxide-ran-propylene oxide) blocks and mixtures thereof.

Examples of block segments immiscible with epoxy resin are, on the one hand, in particular polyether blocks prepared from alkylene oxides having at least 4 C atoms, preferably butylene oxide, hexylene oxide and/or dodecylene oxide. Particularly preferred as such polyether blocks are polybutylene oxide, polyhexylene oxide and polydodecylene oxide blocks and mixtures thereof.

Examples of block segments immiscible with epoxy resin are, on the other hand, polyethylene, polyethylenepropylene, polybutadiene, polyisoprene, polydimethylsiloxane and polyalkylmethacrylate blocks and mixtures thereof.

In one embodiment, the amphiphilic block copolymer having at least one hydroxyl group is a block copolymer of ethylene oxide and/or propylene oxide and at least one additional alkylene oxide having at least 4 C atoms, preferably from the group consisting of butylene oxide, hexylene oxide and dodecylene oxide.

In another, preferred, embodiment the amphiphilic block copolymer having at least one hydroxyl group is selected from the group consisting of poly(isoprene-block-ethylene oxide) block copolymers (PI-b-PEO), poly(ethylenepropylene-b-ethylene oxide) block copolymers (PEP-b-PEO), poly(butadiene-b-ethylene oxide) block copolymers (PB-b-PEO), poly(isoprene-b-ethylene oxide-b-isoprene) block copolymers (PI-b-PEO-PI), poly(isoprene-b-ethylene oxide-methylmethacrylate) block copolymers (PI-b-PEO-b-PMMA), and poly(ethylene oxide)-b-poly(ethylene-alt-propylene) block copolymers (PEO-PEP).

In particular, the amphiphilic block copolymers can be present in diblock, triblock or tetrablock form. For multiblocks, i.e., in particular for tri- or tetrablocks, these may be present in linear or branched, in particular in star block, form.

The preparation of the amphiphilic block copolymers is known to a person skilled in the art, for example from Macromolecules 1996, 29, 6994-7002, and *Macromolecules* 2000, 33, 9522-9534 and *J. Polym. Sci. Part B: Polym. Phys.* 2007, 45, 3338-3348, the disclosures of which are hereby incorporated by reference. The amphiphilic block has at least one hydroxyl group. The amphiphilic block copolymer may have one or more hydroxyl groups, depending on the preparation method.

If, for example, the polymerization of alkylene oxides is initiated using methanol and terminated using acid, this results in an amphiphilic block copolymer having a hydroxyl group.

On the other hand, if a diol, for example ethylene glycol, is used to initiate the polymerization, an amphiphilic block copolymer having two hydroxyl groups is obtained.

The use of alcohols having three, four, or more hydroxyl groups as starter correspondingly results in amphiphilic block copolymers having three, four, or more hydroxyl groups.

The preparation may be carried out, for example, in a sequential synthesis process in which the first monomer, for example butylene oxide, is first polymerized with the assistance of a starter, followed by addition of the second monomer, for example ethylene oxide, which is polymerized to the end of the resulting polymer of the first monomer. Thus, for example, using a monol as starter, a poly(ethylene oxide)-b-poly(butylene oxide) (PEO-PBO) amphiphilic diblock copolymer may be prepared. The use of a diol results, for example, in a poly(ethylene oxide)-b-poly(butylene oxide)-poly(ethylene oxide) (PEO-PBO-PEO) amphiphilic triblock copolymer.

However, a first monomer, for example butylene oxide, may be polymerized first with the assistance of a starter, followed by addition of a mixture of two or more monomers, for example a mixture of ethylene oxide and butylene oxide, which are polymerized to the end of the resulting polymer of the first monomer. Thus, for example, a poly(ethylene oxide/butylene oxide)-poly(butylene oxide)-poly(ethylene oxide/butylene oxide) (PEO/BO-PBO-PEO/BO) amphiphilic block copolymer may be prepared.

As an example for such an amphiphilic block copolymer having at least one hydroxyl group, Fortegra™ 100 from Dow Chemical may be mentioned here.

In addition to these mentioned polyols, small amounts of low-molecular, dihydric or polyhydric alcohols, such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as saccharose, other polyhydric alcohols, low-molecular alkoxylating products of the above-mentioned dihydric and polyhydric alcohols as well as mixtures of the above-mentioned alcohols can be used simultaneously in the preparation of the polymer $Q_{PM}$. Also, small amounts of polyols with a mean OH functionality of more than 3, for example sugar polyols, can be used simultaneously.

The polymers $Q_{PM}$ are preferably di- or higher-functional polyols having OH equivalent weights of from 300 to 6,000 g/OH equivalent, in particular from 600 to 4,000 g/OH equivalent, preferably from 700-2,200 g/OH equivalent. Further, the polyols are preferably selected from the group consisting of polyethylene glycols, polypropylene glycols, polyethylene glycol-polypropylene glycol block copolymers, polybutylene glycols, hydroxyl terminated polybutadienes, hydroxyl terminated butadiene/acrylonitrile copolymers, hydroxyl terminated synthetic rubbers, the hydrogenation products thereof and mixtures of these mentioned polyols.

For certain applications, suitable polymers $Q_{PM}$ are in particular polybutadienes or polyisoprenes having hydroxyl groups or the partially or completely hydrogenated reaction products.

Moreover, also di- or higher functional amino group terminated polyethylene ethers, polypropylene ethers such as are commercially available, for example, under the name Jeffamine® from Huntsman, polybutylene ethers, polybutadienes, butadiene/acrylonitrile copolymers such as are commercially available, for example, under the name Hypro™ (formerly Hycar®) ATBN from Nanoresins AG, Germany, or Emerald Performance Materials LLC, can be used as polymers $Q_{PM}$.

It is also possible to use hydroxyl, mercapto or amino group terminated polysiloxanes as polymers $Q_{PM}$.

The polymers $Q_{PM}$ can furthermore also undergo chain extension, which can be performed in a manner known to a person skilled in the art by reacting them with polyamines, polyols, and polyisocyanates, in particular diamines, diols, and diisocyanates.

In particular, diols and/or diamines and diisocyanates are preferred for the chain extension. Of course, it is clear to a person skilled in the art that higher functional polyols such as, for example, trimethylolpropane or pentaerythritol, or higher functional polyisocyanates such as isocyanurates of diisocyanates can also be used for chain extension.

For polyurethane polymers in general and for chain-extended polyurethane polymers in particular, it is advantageous to make sure that the polymers do not have too high a viscosity, in particular if higher functional compounds are used for chain extension.

Preferred polymers $Q_{PM}$ are polyols with molecular weights between 600 and 6000 daltons, selected from the group consisting of polyethylene glycols, polypropylene glycols, polyethylene glycol-polypropylene glycol block polymers, polybutylene glycols, hydroxyl terminated polybutadienes, hydroxyl terminated butadiene-acrylonitrile copolymers as well as mixtures thereof.

Particularly preferred polymers $Q_{PM}$ are α,ω-dihydroxy-polyalkylene glycols having $C_2$-$C_6$ alkylene groups or mixed $C_2$-$C_6$ alkylene groups that are terminated by amino, thiol, or preferably hydroxyl groups or a polybutadiene or polyisoprene having hydroxyl groups or a partially or completely hydrogenated reaction product thereof.

Particularly suitable as the polyphenol $Q_{PP}$ are bis-, tris- and tetraphenols. This means not only pure phenols but optionally also substituted phenols. The nature of the substitution can be quite diverse. In particular, this means a direct substitution on the aromatic ring to which the phenolic OH group is bonded. By phenols furthermore is meant not only mononuclear aromatics but also polynuclear or condensed aromatics or heteroaromatics having the phenolic OH group directly on the aromatic or heteroaromatic ring.

Bisphenols and trisphenols are especially suitable. For example, suitable bisphenols or trisphenols are 1,4-dihydroxybenzene, 1,3-dihydroxybenzene, 1,2-dihydroxybenzene, 1,3-dihydroxytoluene, 3,5-dihydroxybenzoates, 2,2-bis(4-hydroxyphenyl)propane bisphenol A), bis(4-hydroxyphenyl)methane (=bisphenol F), bis(4-hydroxyphenyl)sulfone (=bisphenol S), naphthoresorcinol, dihydroxynaphthalene, dihydroxyanthraquinone, dihydroxybiphenyl, 3,3-bis(p-hydroxyphenyl)phthalide, 5,5-bis (4-hydroxyphenyl)hexahydro-4,7-methanoindane, phenolpthalein, fluorescein, 4,4'-[bis-(hydroxyphenyl)-1,3- phenylenebis-(1-methylethylidene)] (=bisphenol M), 4,4'-[bis-(hydroxyphenyl)-1,4-phenylenebis-(1-methylethylidene)] (=bisphenol P), 2,2'-diallyl bisphenol A, diphenols and dicresols prepared by reacting phenols or cresols with diisopropylidene benzene, phloroglucinol, gallic acid esters, phenol or cresol novolacs with —OH-functionalities of from 2.0 to 3.5 as well as all isomers of the above-mentioned compounds.

Preferred diphenols and dicresols prepared by reacting phenols or cresols with diisopropylidene benzene have a chemical structural formula as accordingly shown below for cresol as an example:

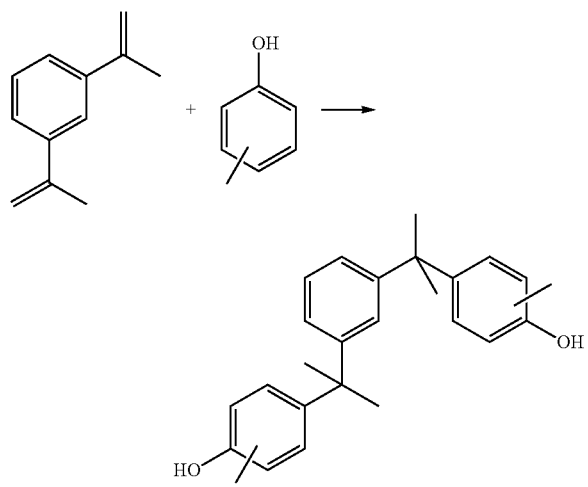

Low-volatility bisphenols are especially preferred. Bisphenol M, bisphenol S, and 2,2'-diallyl bisphenol A are considered as most preferred.

$Q_{PP}$ preferably has 2 or 3 phenol groups.

At least one polyisocyanate is used to synthesize the polyurethane prepolymer. The polyisocyanate used for this purpose is in particular a diisocyanate or triisocyanate.

Aliphatic, cycloaliphatic or aromatic polyisocyanates, in particular diisocyanates, can be used as polyisocyanates. Particularly suitable are the following:

1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,10-decamethylene diisocyanate, 1,12-dodecamethylene diisocyanate, lysine and lysine ester diisocyanate, cyclohexane 1,3- and -1,4-diisocyanate and any mixture of these isomers, 1-methyl-2,4- and -2,6-diisocyanatocyclohexane and any mixture of these isomers (HTDI or $H_6$TDI), 1-isocyanato-3,3,5-trimethyl-5-isocyanatomethylcyclohexane (=isophorone diisocyanate or IPDI), perhydro-2,4'- and -4,4'-diphenylmethane diisocyanate (HMDI or $H_{12}$MDI), 1,4-diisocyanato-2,2,6-trimethylcyclohexane (TMCDI), 1,3- and 1,4-bis-(isocyanatomethyl)cyclohexane, m- and p-xylylene diisocyanate (m- and p-XDI), m- and β-tetramethyl-1,3- and -1,4-xylylene diisocyanate (m- and p-TMXDI), bis-(1-isocyanato-1-methylethyl)-naphthalene.

2,4- and 2,6-toluoylene diisocyanate and any mixture of these isomers (TDI), 4,4'-, 2,4'- and 2,2'-diphenylmethane diisocyanate and any mixture of these isomers (MDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODI), dianisidine diisocyanate (DADI).

Oligomers (e.g., biurets, isocyanurates) and polymers of the above-mentioned monomeric diisocyanates.

Any mixture of the above-mentioned polyisocyanates. Monomeric diisocyanates, in particular MDI, TDI, HDI, and IPDI, are preferred.

In one embodiment, Michael acceptors suited for the preparation of an impact strength modifier C1 used according to the disclosure have the formula (I) or (Ia)

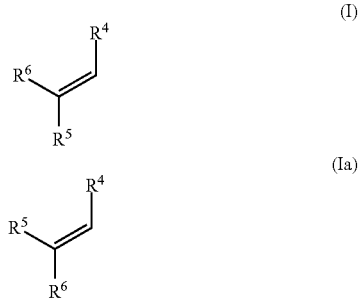

wherein $R^4$ is a hydrogen atom or a moiety selected from the group consisting of $R^7$, —COOR$^7$, and —CN, and and $R^{5'}$ is a moiety selected from the group consisting of COOR$^7$, CONH$_2$, CONHR$^7$, CONR$^7_2$, CN, NO$_2$, PO(OR$^7$)$_2$, SO$_2$R$^7$ and SO$_2$OR$^7$, and $R^6$ is a hydrogen atom or a moiety selected from the group consisting of —CH$_3$, —R$^7$, —COOR$^7$, and —CH$_2$COOR$^7$, wherein R$^7$ is a univalent hydrocarbon moiety having from 1 to 20 carbon atoms.

In another embodiment, the Michael acceptor reacted with the polyurethane prepolymer having isocyanate groups has a hydroxyl group.

According to the disclosure, the Michael acceptor having a hydroxyl group has in particular the formula (VII) or (VIIa).

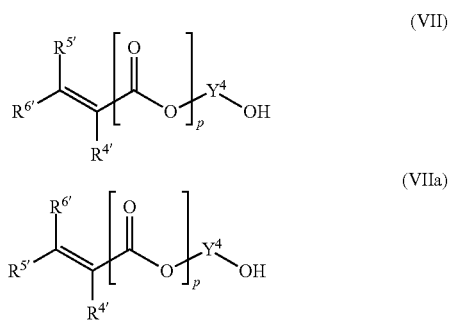

wherein $R^{4'}$ is a hydrogen atom or a moiety selected from the group consisting of $R^7$, —COOR$^7$, and —CN, and $R^{5'}$ is a moiety selected from the group consisting of COOR$^7$, CONH$_2$, CONHR$^7$, CONR$^7_2$, CN, NO$_2$, PO(OR$^7$)$_2$, SO$_2$R$^7$, and SO$_2$OR$^7$, and $R^{6'}$ is a hydrogen atom or a moiety selected from the group consisting of —R$^7$, —COOR$^7$, —CH$_2$COOR$^7$, and —CN, wherein R$^7$ is a univalent hydrocarbon moiety having from 1 to 20 carbon atoms;

$Y^4$ is an alkylene group having from 1 to 6 carbon atoms or provided that p and p'=0 is nothing; and p represents 0 or 1.

Particularly exemplary embodiments of compounds of the formulas (VII) and (VIIa) are those compounds wherein $Y^4$ is nothing and p is 0 (vinyl alcohol); $Y^4$ is $CH_2$ and p is 0 (allyl alcohol); $Y^4$ is $CH_2CH_2$ and p is 1, $R^{4'}$ is H or $CH_3$ (hydroxyethyl(meth)acrylate (HEA) (HEMA)); $Y^4$ is propylene and p is 1, $R^{4'}$ is H or $CH_3$ (hydroxypropyl(meth)acrylate (HPA) (HPMA)); $Y^4$ is butylene, p is 1, $R^{4'}$ is H or $CH_3$ (hydroxybutyl(meth)acrylate).

Examples of suitable Michael acceptors are maleic or fumaric acid diesters such as dimethyl maleate, diethyl maleate, dibutyl maleate, diethyl fumarate; citraconic acid diesters such as dimethyl citraconate; acrylic or methacrylic acid esters such as methyl (meth)acrylate, ethyl (meth)acrylate, butyl (meth)acrylate, lauryl (meth)acrylate, stearyl (meth)acrylate, tetrahydrofuryl (meth)acrylate, isobornyl (meth)acrylate; acrylic or methacrylic acid amides such as (meth)acrylamide, methyl (meth)acrylamide, butyl(meth)acrylamide, dimethyl(meth)acrylamide, dibutyl(meth)acrylamide; itaconic acid diesters such as dimethyl itaconate; cinnamic acid esters such as methyl cinnamate; vinylphosphonic acid diesters such as vinylphosphonic acid dimethylester; vinylsulfonic acid esters, in particular vinylsulfonic acid aryl esters; vinyl sulfones; vinylnitriles such as acrylonitrile, crotonitrile, 2-pentenenitrile or fumaronitrile; 1-nitroethylenes such as β-nitrostyrene; and Knoevenagel condensation products such as, for example, those formed from malonic acid diesters and aldehydes such as formaldehyde, acetaldehyde, or benzaldehyde. Especially suitable are maleic acid diesters, (meth)acrylic acid esters, (meth)acrylic acid amides, phosphonic acid diesters and vinylnitriles.

Preferred Michael acceptors are maleic acid dimethyl, maleic acid diethyl and maleic acid dibutyl ester, (meth)acrylic acid tetrahydrofurfuryl, (meth)acrylic acid isobornyl, (meth)acrylic acid hexyl, (meth)acrylic acid lauryl, (meth)acrylic acid stearyl, (meth)acrylic acid-2-hydroxyethyl and (meth)acrylic acid-3-hydroxypropyl ester, (meth)acrylamide, N-methyl(meth)acrylamide, N,N-Dimethyl(meth)acrylamide, phosphonic acid dimethyl, phosphonic acid diethyl and phosphonic acid dibutylester, acrylonitrile, 2-pentenenitrile, fumaronitrile and β-Nitrostyrene and mixtures of these compounds.

In one embodiment, the impact strength modifier C1 used according to the disclosure has the general formula (II)

$Y^3$ independently of one another is H or an alkyl group having from 1 to 10 carbon atoms or a moiety of the formula (III),

(III)

wherein $R^4$ is a hydrogen atom or a moiety selected from the group consisting of $R^7$, —$COOR^7$, and —CN, and and $R^{5'}$ is a moiety selected from the group consisting of $COOR^7$, $CONH_2$, $CONHR^7$, $CONR^7_2$, CN, $NO_2$, $PO(OR^7)_2$, $SO_2R^7$ and $SO_2OR^7$, and $R^6$ is a hydrogen atom or a moiety selected from the group consisting of —$R^7$, —$COOR^7$, —$CH_2COOR^7$, and —CN, wherein $R^7$ is a univalent hydrocarbon moiety having from 1 to 20 carbon atoms;

$Y^4$ is an alkylene group having from 1 to 6 carbon atoms or provided that p and p'=0 is nothing; and $Y^5$ is a divalent moiety of the formula (IV) or (IV');

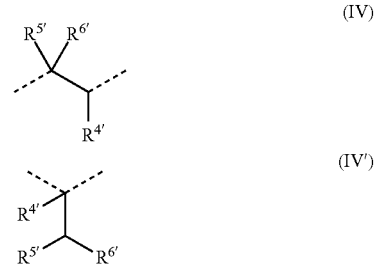

wherein $R^{4'}$ is a hydrogen atom or a moiety selected from the group consisting of $R^7$, —ODOR', and —CN, and $R^{5'}$ is a moiety selected from the group consisting of $COOR^7$, $CONH_2$, $CONHR^7$, $CONR^7_2$, CN, $NO_2$, $PO(OR^7)_2$, $SO_2R^7$, and $SO_2OR^7$, and $R^{6'}$ is a hydrogen atom or a moiety selected from the group consisting of —$R^7$, —$COOR^7$, —$CH_2COOR^7$, and —CN,

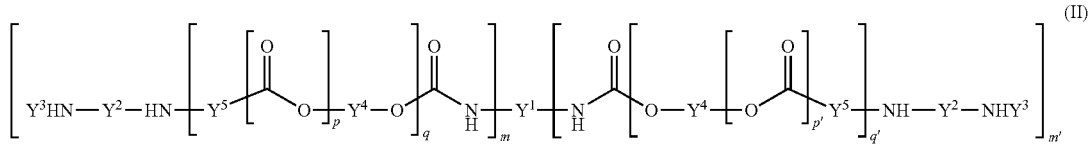

(II)

wherein $Y^1$ is a linear or branched polyurethane prepolymer terminated with m+m' isocyanate groups, after removal of all terminal isocyanate groups;

$Y^2$ is a divalent group of a polyoxyalkylene having $C_2$-$C_6$alkylene groups, a polybutadiene, a butadiene/acrylonitrile copolymer or a synthetic rubber;

wherein $R^7$ is a univalent hydrocarbon moiety having from 1 to 20 carbon atoms;

p and p' are each 0 or 1;

q and q' are each 0 or 1;

m and m' are each values of from 0 to 7, preferably 0 or 1 or 2, provided that m+m' are a value of from 1 to 8, in particular 1 or 2.

Provided that q and q'=0, formula (II) simplifies to formula (V), i.e.

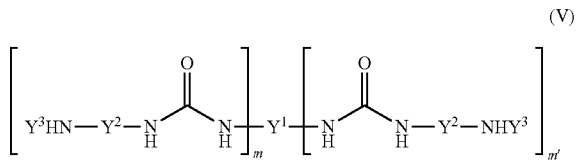

(V)

wherein $Y^1$ is a linear or branched polyurethane prepolymer terminated with m+m' isocyanate groups, after removal of all terminal isocyanate groups;

$Y^2$ is a divalent group of a polyalkoxylene having $C_2$-$C_6$alkylene groups, a polybutadiene, a butadiene/acrylonitrile copolymer or a synthetic rubber; and $Y^3$ independently of one another is H or an alkyl group having from 1 to 10 carbon atoms or a moiety of the formula (VI),

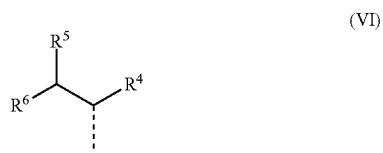

(VI)

wherein
$R^4$ is a hydrogen atom or a moiety selected from the group consisting of $R^7$, —$COOR^7$, and —CN, and
and $R^{5'}$ is a moiety selected from the group consisting of $COOR^7$, $CONH_2$, $CONHR^7$, $CONR^7_2$, CN, $NO_2$, $PO(OR^7)_2$, $SO_2R^7$ and $SO_2OR^7$, and
$R^6$ is a hydrogen atom or a moiety selected from the group consisting of —$R^7$, —$COOR^7$, —$CH_2COOR^7$, and —CN, wherein $R^7$ is a univalent hydrocarbon moiety having from 1 to 20 carbon atoms;

m and m' are each values of from 0 to 7, preferably 0 or 1 or 2, provided that m+m' are a value of from 1 to 8, in particular 1 or 2.

The dotted lines in the formulas of the present disclosure in each case represent the bond between the respective substituent and the corresponding moiety of the molecule.

In another embodiment, the impact strength modifier C1 is wherein the reaction product obtained from the reaction of the polyurethane prepolymer having isocyanate groups and the Michael acceptor is further reacted with a primary diamine and subsequently optionally with a Michael acceptor, or with a secondary diamine prepared by reaction with a Michael acceptor, wherein the primary amine has a molecular weight of 100-4,000 g/mol, preferably 400-3,000 g/mol, particularly preferred of 600-2,200 g/mol.

In a second aspect, the present disclosure pertains to an amino group terminated impact strength modifier prepared by reacting a polyurethane prepolymer having isocyanate groups, a primary diamine, and optionally at least one Michael acceptor, wherein the polyurethane prepolymer having isocyanate groups is prepared from at least one polyisocyanate and at least one polyester or polyether polyol having at least two hydroxyl groups, provided that if the primary diamine has a molecular weight of less than 600 g/mol, it is compulsory that a Michael acceptor is involved in the preparation of the amino group terminated impact strength modifier and, in comparison to the polyurethane prepolymer having isocyanate groups, the primary diamine is used such that the ratio of isocyanate groups to amino groups is less than 0.5.

In particular, the ratio of isocyanate groups to amino groups is less than 0.4, preferably less than 0.25.

A method for preparing the impact strength modifier C1 is illustrated below. According to the disclosure, the amino group terminated impact strength modifier C1 is prepared by reacting a polyurethane prepolymer having isocyanate groups, a primary diamine, and optionally at least one Michael acceptor. This opens up many possibilities for the reaction sequence and the resultant products.

In order to further clarify the synthesis of the impact strength modifier C1, in particular the following reaction routes have been found to be advantageous:

Reaction scheme I:

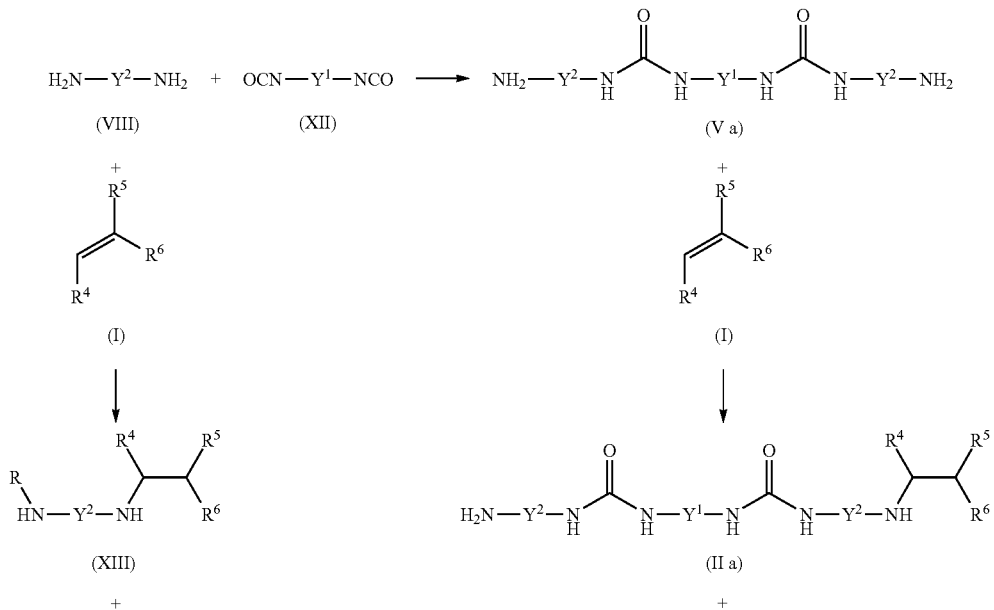

-continued

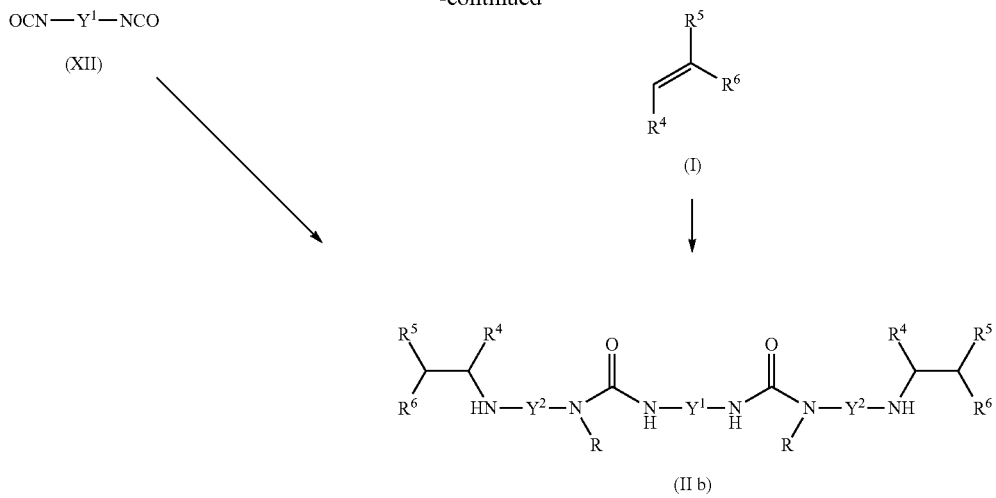

(II b)

According to reaction scheme I, first a primary diamine of the formula (VIII) is reacted with a polyurethane prepolymer having isocyanate groups of the formula (XII) to yield the amino group terminated impact strength modifier (V a) according to the disclosure. In this case the amino group terminated impact strength modifier has primary amino groups.

Here, the diamine of the formula (VIII) is used in stoichiometric excess, in particular in a ratio of $NH_2$ groups to NCO groups greater than 2, in particular greater than 2.5, preferably greater than 4, relative to the polyurethane prepolymer of the formula (XII). This ensures a reliable formation of a simple adduct and prevents the formation of higher-molecular oligomeric addition products.

Alternatively, the primary diamine (VIII) reacts with the Michael acceptor of the formula (I) in a first reaction step to yield the secondary amine of the formula (XIII). Depending on the stoichiometry of the primary amine (VIII) with respect to the Michael acceptor of the formula (I), R in formula (XIII) and formula (II b) represents H or a substituent of the formula (VI). In a further step, this secondary amine of the formula (XIII) can be reacted with a polyurethane prepolymer having isocyanate groups of the formula (XII) to yield the amino group terminated impact strength modifier according to the disclosure of the formula (II b). In this case the amino group terminated impact strength modifier has secondary amino groups.

Alternatively, this amino group terminated impact strength modifier of the formula (II b) is obtainable by reacting the impact strength modifier of the formula (V a) with the Michael acceptor of the formula (I). Here, depending on the used amount of the Michael acceptor of the formula (I) an amino group terminated impact strength modifier of the formula (II a) or (II b) is obtained. In the first case the amino group terminated impact strength modifier has both primary and secondary amino groups; in the latter case both primary amino groups of the amino group terminated impact strength modifier of the formula (V a) have been reacted with the Michael acceptor to yield secondary amino groups.

Reaction scheme II:

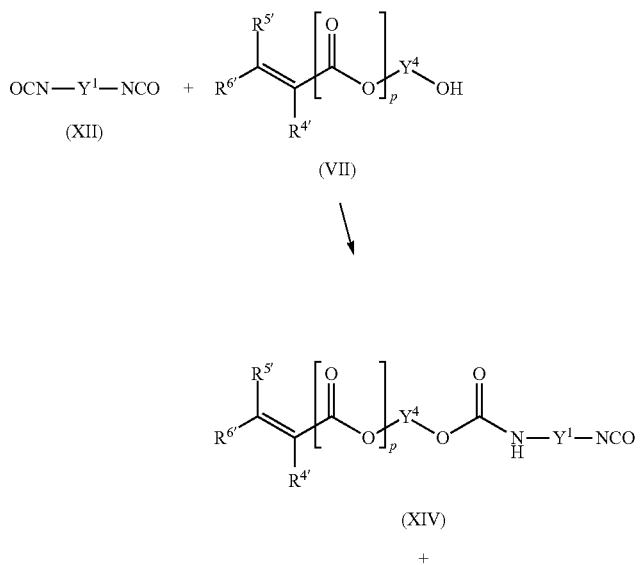

+

-continued $$H_2N-Y^2-NH_2 \quad (VIII)$$

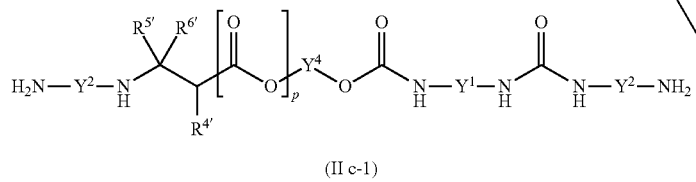

(II c-1)

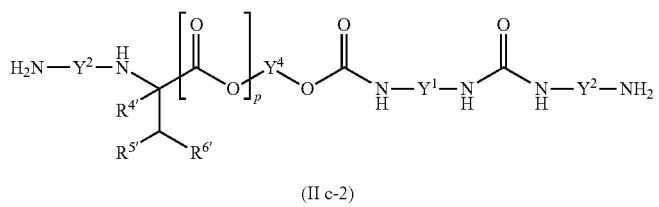

(II c-2)

New manufacturing routes ensue if a Michael acceptor containing hydroxyl groups is used as Michael acceptor. In particular the reaction schemes II and III illustrate such reaction routes on the basis of the Michael acceptor containing hydroxyl groups according to formula (VII).

According to reaction scheme II, a polyurethane prepolymer having isocyanate groups of the formula (XII) is reacted with the Michael acceptor containing hydroxyl groups according to formula (VII). If the amount of the Michael acceptor containing hydroxyl groups according to formula VII is selected such that the ratio of the number of hydroxyl groups of the Michael acceptor to the number of isocyanate groups of the polyurethane prepolymer having isocyanate groups of the formula (XII) is 0.5, this reaction will quantitatively yield the intermediate product containing isocyanate groups of the formula (XIV) to which a primary diamine of the formula (VIII) is added (in excess) in a subsequent reaction step. Depending on the addition of this diamine to the double bond of the intermediary product of the formula (XIV), the impact strength modifiers according to the disclosure of the formula (II c-1) or the formula (II c-2) are formed in this reaction.

Reaction scheme III:

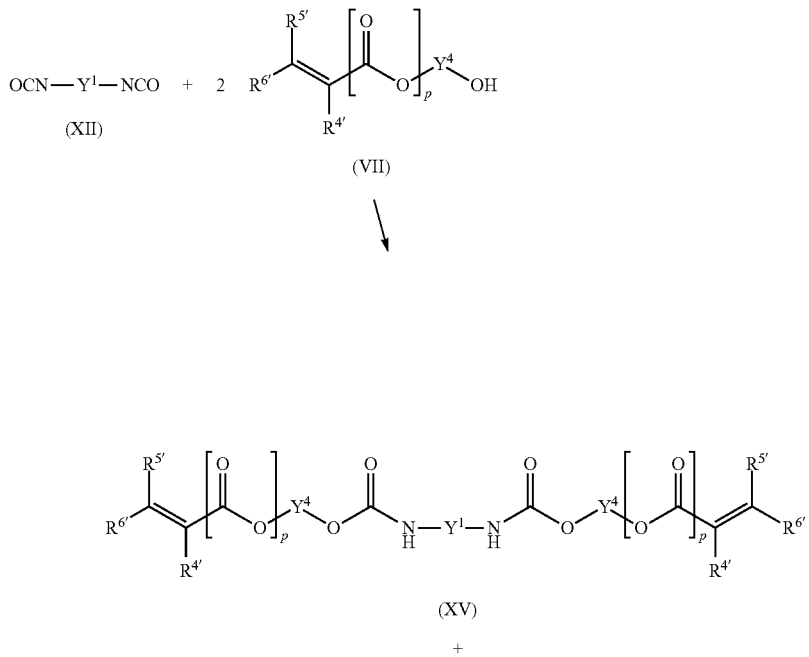

+

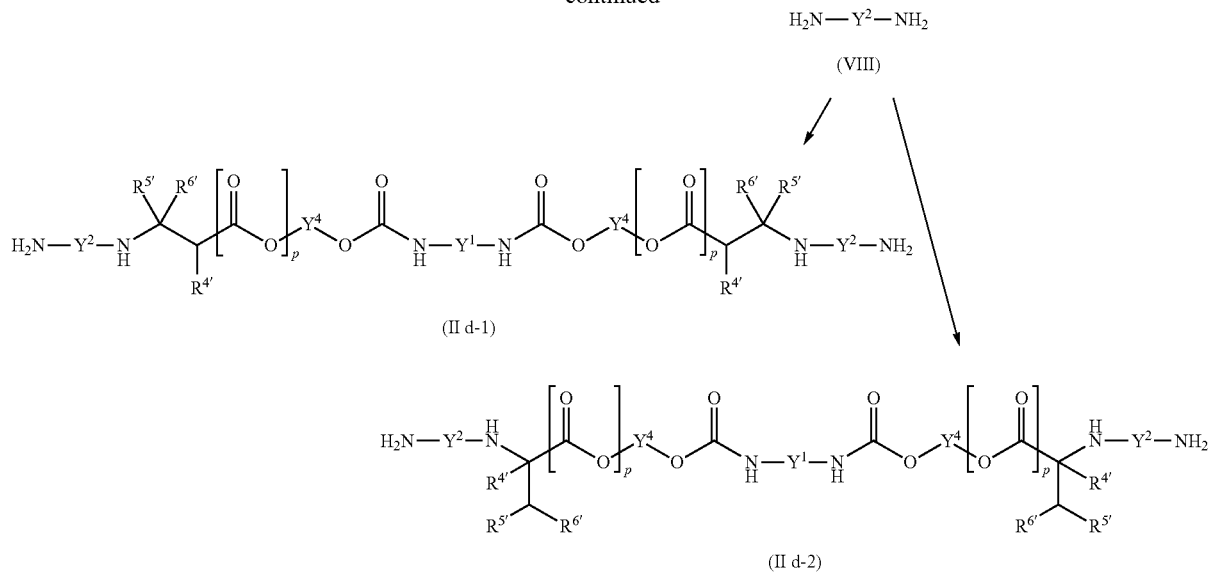

(II d-1)

(II d-2)

If a Michael acceptor containing hydroxyl groups according to formula (VII) is reacted with a polyurethane prepolymer having isocyanate groups according to formula (XII) stoichiometrically or in stoichiometric excess relative to the Michael acceptor containing hydroxyl groups (i.e. the ratio of the number of hydroxyl groups of the Michael acceptor to the number of isocyanate groups of the polyurethane prepolymer having isocyanate groups of the formula (XII) has a value≥1), the intermediate product according to formula (XV) is formed quantitatively as illustrated in reaction scheme III.

In another reaction step according to reaction scheme III, the intermediate product according to formula (XV) is reacted with a primary diamine of the formula (VIII). Depending on the addition of this diamine to the double bonds of the intermediary product of the formula (XV), the impact strength modifiers according to the disclosure of the formula (II d-1) or the formula (II d-2) are formed in this reaction.

It is clear to a person skilled in the art that if a Michael acceptor containing hydroxyl groups according to formula (VII) and a polyurethane prepolymer having isocyanate groups of the formula (XII) are used in the reaction such that the ratio of the number of hydroxyl groups of the Michael acceptor to the number of isocyanate groups of the polyurethane prepolymer having isocyanate groups of the formula (XII) has a value between 0.5 and 1, a mixture of the reaction product of the formula (XIV) illustrated in reaction scheme II and the reaction product (XV) illustrated in reaction scheme III are formed, which, after a further reaction with a primary diamine of the formula (VIII), results in the formation of a mixture of the impact strength modifiers according to the disclosure of the formula (II c-1) or, depending on the addition of the diamine to the double bonds of the intermediate product, of the formula (II c-2) and the formula (II d-1) or, depending on the addition of the diamine to the double bonds of the intermediate product, of the formula (II d-2).

It should be noted that the Michael acceptor according to formula (VII) is a exemplary embodiment of a Michael acceptor, namely a hydroxyl containing Michael acceptor. Hence, the synthetic pathway illustrated in reaction scheme III offers the possibility to achieve a direct reaction of the Michael acceptor and the polyurethane prepolymer having isocyanate groups, which results in the integration of the structural element originating from the Michael acceptor in the polymer backbone chain (polymer backbone) of the amino group terminated impact strength modifier in a greater distance from the polymer end as opposed to the synthetic pathway according to reaction scheme I.

In one embodiment, the two-component epoxy resin composition contains a liquid rubber C2 which contains an epoxy terminated polymer, in particular an epoxy terminated acrylonitrile/butadiene copolymer and is a component of the epoxy resin component K1, in particular in an amount of from 1 to 45% by weight, based on the weight of the epoxy resin component K1.

In another embodiment, the impact strength modifier is a polymer C3 of the formula (XI)

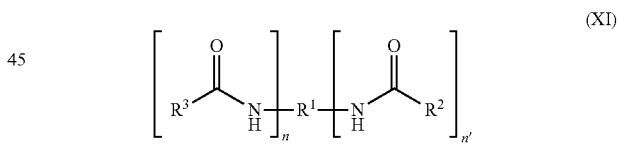

(XI)

In this formula, n and n' independently of one another are each values of from 0 to 7, preferably 0 or 1 or 2, provided that n+n' is a value of from 1 to 8, in particular 1 or 2.

Moreover, $R^1$ is a linear or branched polyurethane prepolymer terminated with n+n' isocyanate groups, after removal of all terminal isocyanate groups.

$R^2$ and $R^3$ each independently of one another represent a substituent selected from the group consisting of

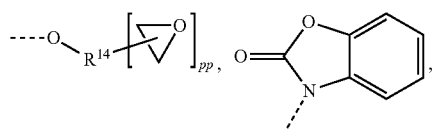

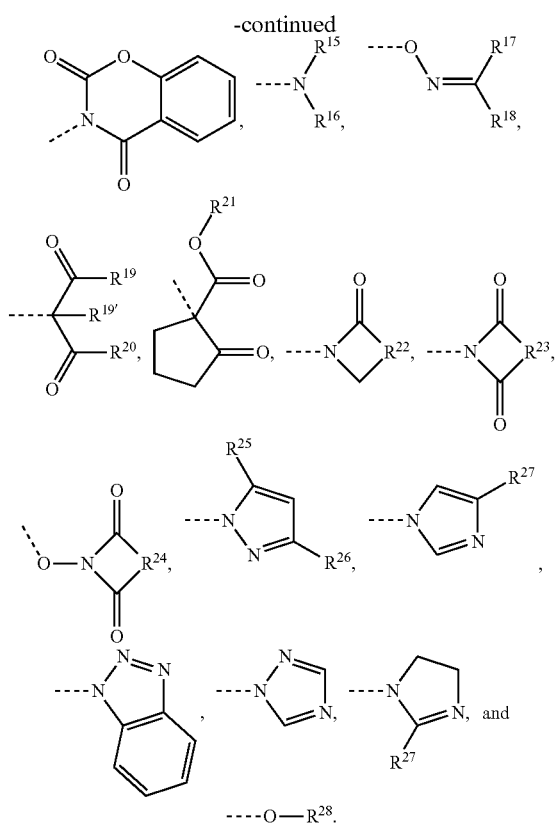

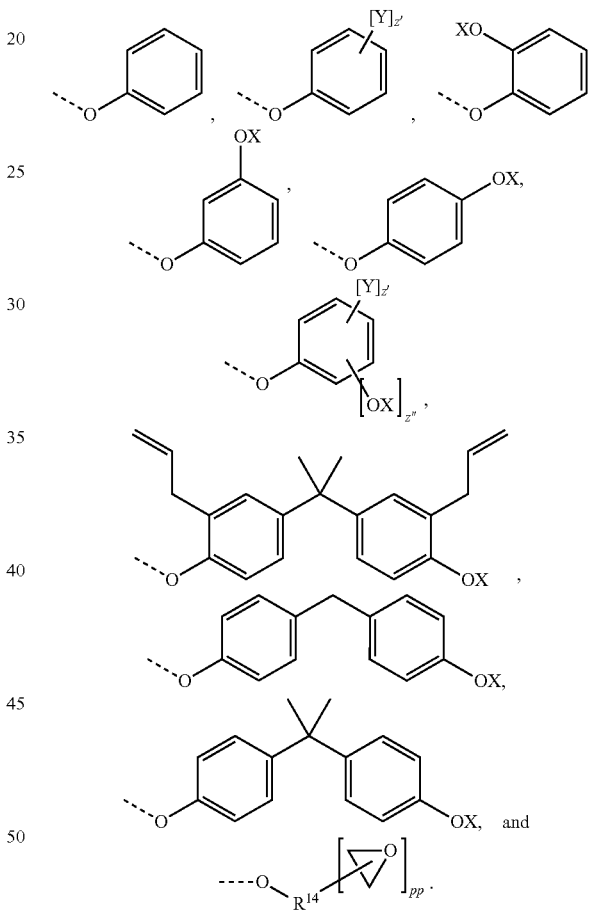

Here, $R^{14}$ is in turn a moiety of an aliphatic, cycloaliphatic, aromatic, or araliphatic epoxy containing a primary or secondary hydroxyl group, after removal of the hydroxy or epoxy groups, and pp represents the values 1, 2 or 3.

In the present disclosure, an "araliphatic moiety" is defined an aralkyl group, i.e. an alkyl group substituted by aryl groups (cf. Römpp, CD Römpp Chemie Lexikon, Version 1, Stuttgart/New York, Georg Thieme Verlag 1995).

Moreover, $R^{15}$, $R^{16}$, $R^{17}$, and $R^{18}$ each independently of one another represent an alkyl or cycloalkyl or aralkyl or arylalkyl group or else $R^{15}$ together with $R^{16}$, or $R^{17}$ together with $R^{18}$ forms a part of an optionally substituted 4- to 7-membered ring.

Moreover, $R^{19}$, $R^{19'}$, and $R^{20}$ each independently of one another represent an alkyl or aralkyl or arylalkyl group or an alkyloxy or aryloxy or aralkyloxy group, and $R^{11}$ represents an alkyl group.

$R^{23}$ and $R^{24}$ each independently of one another represent an alkylene group having from 2 to 5 C atoms which optionally has double bonds or is substituted, or a phenylene group or a hydrogenated phenylene group, and $R^{25}$, $R^{26}$, and $R^{27}$ each independently of one another represent H or an alkyl group or an aryl group or an aralkyl group.

Finally, $R^{28}$ represents an aralkyl group or a mono- or polynuclear substituted or unsubstituted aromatic group which optionally has aromatic hydroxyl groups.

Phenols or bisphenols, after removal of a hydroxyl group, are in particular firstly to be considered as $R^{28}$. In particular, phenol, cresol, resorcinol, catechol, cardanol (3-pentadecenylphenol (from cashew nutshell oil)), nonylphenol, phenols reacted with styrene or dicyclopentadiene, bisphenol A, bisphenol F, and 2,2'-diallylbisphenol A are preferred examples of such phenols and bisphenols.

Hydroxybenzyl alcohol and benzyl alcohol, after removal of a hydroxyl group, are in particular secondly to be considered as $R^{28}$.

If $R^{15}$, $R^{16}$, $R^{17}$, $R^{18}$, $R^{19}$, $R^{19'}$, $R^{20}$, $R^{21}$, $R^{25}$, $R^{26}$, or $R^{27}$ represents an alkyl group, the latter is in particular a linear or branched $C_1$-$C_{20}$ alkyl group.

If $R^{15}$, $R^{16}$, $R^{17}$, $R^{18}$, $R^{19}$, $R^{19'}$, $R^{20}$, $R^{25}$, $R^{26}$, $R^{27}$, or $R^{28}$ represents an aralkyl group, the latter group is in particular an aromatic group bonded through methylene, in particular a benzyl group.

If $R^{15}$, $R^{16}$, $R^{17}$, $R^{18}$, $R^{19}$, $R^{19'}$, or $R^{20}$ represents an alkylaryl group, the latter group is in particular a $C_1$ to $C_{20}$ alkyl group bonded through phenylene such as, for example, tolyl or xylyl.

Particularly preferred moieties $R^2$ and/or $R^3$ are moieties selected from the group consisting of Here, the moiety Y stands for a saturated or olefinically unsaturated hydrocarbon moiety with 1 to 20 C atoms, in particular with 1 to 15 C atoms. Preferred Y are in particular an allyl group, a methyl group, a nonyl group, a dodecyl group or an unsaturated $C_{15}$ alkyl group having from 1 to 3 double bonds.

The moiety R represents an alkyl, aryl, aralkyl group, in particular H or methyl.

The indices z' and z" represent the values 0, 1, 2, 3, 4, or 5 provided that the sum z'+z" stands for a value between 1 and 5.

Preferably, the substituents $R^2$ and $R^3$ are identical.

The impact strength modifier C3 of the formula (XI) is prepared from the linear or branched polyurethane prepolymer terminated with n+n' isocyanate groups and one or several isocyanate reactive compounds $R^2H$ and/or $R^3H$. If several of such isocyanate reactive compounds are used, the reaction can proceed sequentially or with a mixture of these compounds.

If the substituents $R^2$ and $R^3$ are reactive toward epoxy groups, the impact strength modifier C3 of the formula (XI) is a part of the hardener component K2. If the substituents $R^2$ and $R^3$ are reactive toward amino groups, the impact strength modifier C3 of the formula (XI) is a part of the hardener component K1. If the substituents $R^2$ and $R^3$ are not reactive toward epoxy groups at room temperature and not reactive toward the amino groups, the impact strength modifier C3 of the formula (XI) is a part of the epoxy resin component K1 and/or the hardener component K2. The proportion of the impact strength modifier C3 of formula (XI) is preferably used in an amount of from 1 to 45% by weight, in particular from 10 to 30% by weight, based on the weight of the respective component K1 and/or K2.

Finally, in another embodiment the impact strength modifier can be an amino group terminated acrylonitrile/butadiene copolymer C4 which is part of the hardener component K2, in particular in an amount of from 10 to 40% by weight, based on the weight of the hardener component K2.

In another exemplary embodiment, the two-component epoxy resin composition according to the present disclosure contains as impact strength modifier C a combination of the amino group terminated impact strength modifier C1 and/or the liquid rubber C2 and/or the polymer C3 having the formula (XI) and/or the amino group terminated acrylonitrile/butadiene copolymer C4.

The weight sum of the amino group terminated impact strength modifier C1, the liquid rubber C2, the polymer C3, and the amino group terminated acrylonitrile/butadiene copolymer C4 contained in the respective components (K1, K2) is preferably not more than 80% by weight, in particular not more than 50% by weight, based on the weight of the respective component (K1, K2).

In one embodiment, the two-component epoxy resin composition according to the present disclosure can further contain at least one core-shell polymer. Core-shell polymers consist of an elastic core polymer and a rigid shell polymer. Particularly suitable core-shell polymers consist of a core of elastic acrylate or butadiene polymer, encapsulated by a rigid shell of a rigid thermoplastic polymer. This core-shell structure either forms spontaneously by demixing, or self-organization, of a block copolymer, or has been prescribed by the method of polymerization, in the form of latex or suspension polymerization with subsequent grafting. Preferred core-shell polymers are those known as MBS polymers, which are available commercially with trademark Clearstrength™ from Atofina, Paraloid™ from Rohm and Haas or F-351™ from Zeon.

Particularly preferred are core-shell polymer particles provided in the form of dried polymer latex Examples of these are GENIOPERL M23A from Wacker, with polysiloxane core and acrylate shell, radiation-crosslinked rubber particles from the NEP range, produced by Eliokem, or Nanoprene from Lanxess, or Paraloid EXL from Rohm and Haas.

Other comparable examples of core-shell polymers are supplied as Albidur™ by Nanoresins AG, Germany. Core-shell polymers are preferably used in the epoxy resin component K1.

In one embodiment, the two-component epoxy resin composition according to the present disclosure can further contain at least one filler F. This is preferably mica, talc, kaolin, wollastonite, feldspar, syenite, chlorite, bentonite, montmorillonite, calcium carbonate (precipitated or ground), dolomite, quartz, silicas (fumed or precipitated), cristobalite, calcium oxide, aluminum hydroxide, magnesium oxide, hollow ceramic beads, hollow glass beads, hollow organic beads, glass beads, color pigments. The term filler F means not only organically coated fillers but also the uncoated forms which are commercially available and known to the person skilled in the art.

Another example is provided by functionalized aluminoxanes, for example as described in U.S. Pat. No. 6,322,890, the content of which is incorporated herein in its entirety.

Preferably, the total content of the entire filler F is from 3 to 50% by weight, preferably from 5 to 35% by weight, in particular from 5 to 25% by weight, based on the weight of the entire composition.

The use of fillers is advantageous in that they improve the aging resistance of the adhesive and advantageously influence the mechanical properties.

Moreover, the two-component epoxy resin composition may comprise further components. These are, for example:

solvents, film forming auxiliaries or extenders such as toluene, xylene, methylethyl ketone, 2-ethoxyethanol, 2-ethoxyethyl acetate, benzyl alcohol, ethylene glycol, diethylene glycol butyl ether, dipropylene glycol butyl ether, ethylene glycol butyl ether, ethylene glycol phenyl ether, N-methylpyrrolidone, propylene glycol butyl ether, propylene glycol phenyl ether, diphenylmethane, diisopropylnaphthalene, mineral oil fractions such as, for example, Solvesso types (from Exxon), aromatic hydrocarbon resins, in particular phenol group containing types, sebacates, phthalates, organic phosphoric and sulfonic esters and sulfonamides;

reactive diluents, e.g., epoxy reactive diluents which have been mentioned above, epoxidized soy oil or flax oil, compounds having acetoacetate groups, in particular acetoacetylated polyols, butyrolactone as well as, moreover, isocyanates and silicones having reactive groups;

polyamines such as, for example aliphatic, cycloaliphatic or arylaliphatic primary diamines, e.g., ethylenediamine, 1,2-propanediamine, 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methylpentane (MPMD), 2-butyl-2-ethyl-1,5-pentanediamine (C11-neodiamine), 1,6-hexanediamine, 2,5-dimethyl-1,6-hexanediamine, 2,2,4- and 2,4,4-trimethylhexamethylenediamine (TMD), 1,7-heptanediamine, 1,8-octanediamine, 1,9-nonanediamine, 1,10-decanediamine, 1,11-undecanediamine, 1,12-dodecanediamine, 1,2-, 1,3- and 1,4-diaminocyclohexane, bis-(4-aminocyclohexyl)methane ($H_{12}$-MDA), bis-(4-amino-3-methylcyclohexyl)methane, bis-(4-amino-3-ethylcyclohexyl)methane, bis-(4-amino-3,5-dimethylcyclohexyl)methane, bis-(4-amino-3-ethyl-5-methylcyclohexyl)methane (M-MECA), 1-amino-3-aminomethyl-3,5,5-trimethylcyclohexane (=isophoronediamine or IPDA), 2- and 4-methyl-1,3-diaminocyclohexane and mixtures thereof, 1,3- and 1,4-bis-(aminomethyl)cyclohexane, 2,5(2,6)-bis-(aminomethyl)-bicyclo[2.2.1]heptane (NBDA), 3(4),8(9)-bis-(aminomethyl)-tricyclo[$5.2.1.0^{2,6}$]decane, 1,4-diamino-2,2,6-trimethylcyclohexane (TMCDA), 1,8-menthanediamine, 3,9-bis-(3-aminopropyl)-2,4,8,10-tetraoxaspiro[5.5]undecane and 1,3- and 1,4-xylylenediamine;

aliphatic primary diamines containing ether groups, e.g., bis(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxamidecane-1,13-diamine and higher oligomers of these diamines, bis-(3-aminopropyl) polytetrahydrofuranes and other polytetrahydrofuranediamines having molecular weights ranging, e.g., from 350 to 2000, as well as polyoxyalkylenediamines. Typically, the latter are products of the amination of polyoxyalkylene diols and can for example be obtained under the name Jeffamine® (from Huntsman), under the name Polyetheramin (from BASF) or under the name PC Amine® (from Nitroil). Particularly suitable polyoxyalkylenediamines are Jeffamine® D-230, Jeffamine® D-400, Jeffamine® D-2000, Jeffamine® XTJ-511, Jeffamine® ED-600, Jeffamine® ED-900, Jeffamine® ED-2003, Jeffamine® XTJ-568, Jeffamine® XTJ-569, Jeffamine® XTJ-523, Jeffamine® XTJ-536, Jeffamine® XTJ-542, Jeffamine® XTJ-559, Jeffamine® EDR-104, Jeffamine® EDR-148, Jeffamine® EDR-176; Polyetheramin D 230, Polyetheramin D 400, and Polyetheramin D 2000, PC Amine® DA 250, PC Amine® DA 400, PC Amine® DA 650, and PC Amine® DA 2000;

polyamines having secondary amino groups,
e.g., diethylenetriamine (DETA), dipropylenetriamine (DPTA), bishexamethylenetriamine (BHMT), 3-(2-aminoethyl)aminopropylamine, N3-(3-aminopentyl)-1,3-pentanediamine, N5-(3-aminopropyl)-2-methyl-1,5-pentanediamine, N5-(3-amino-1-ethylpropyl)-2-methyl-1,5-pentanediamine, N,N'-dibutylethylenediamine; N,N'-di-tert.butyl-ethylenediamine, N,N'-diethyl-1,6-hexanediamine, 1-(1-methylethylamino)-3-(1-methylethylaminomethyl)-3,5,5-trimethylcyclohexane (Jefflink® 754 from Huntsman), N4-cyclohexyl-2-methyl-N-2-(2-methylpropyl)-2,4-pentanediamine, N,N'-dialkyl-1,3-xylylenediamine, bis-(4-(N-alkylamino) cyclohexyl)methane, 4,4'-trimethylenedipiperidine, N-alkylated polyetheramines, e.g., the Jeffamine® types SD-231, SD-401, SD-404, and SD-2001 (from Huntsman);

amine/polyepoxide addition products,
in particular additions products of the mentioned polyamines with diepoxides with a molar ratio of at least 2/1, in particular with a molar ration of from 2/1 to 6/1;

polyamidoamines
which are the reaction products of a mono- or polybasic carboxylic acid or the esters or anhydrides thereof, in particular the reaction products of a dimer fatty acid, and a aliphatic, cycloaliphatic or aromatic polyamine used in a stoichiometric excess, in particular a polyalkyleneamine such as, e.g., DETA or triethylenetetramine (TETA), in particular the commercially available polyamidoamines Versamid® 100, 125, 140, and 150 (from Cognis), Aradur® 223, 250, and 848 (from Huntsman), Euretek® 3607, Euretek® 530 (from Huntsman), Beckopox® EH 651, EH 654, EH 655, EH 661, and EH 663 (from Cytec);

Polyethyleneimines (PEI).
These are branched polymeric amines derived from the polymerization of ethyleneimine. A suitable polyethyleneimine typically has an average molecular weight in the range of from 250 to 25,000 g/mol and contains tertiary, secondary, and primary amino groups. Polyethyleneimines can be obtained, for example, under the trade name Lupasol® (from BASF), for example, the types Lupasol® FG, Lupasol® G20, and Lupasol® PR 8515;

polymers such as, e.g., polyamides, polysulfides, polyvinylformal (PVF), polyvinylbutyral (PVB), polyurethanes (PUR), polymers containing carboxylic groups, polyamides, butadiene-acrylonitrile copolymers, styrene-acrylonitrile copolymers, butadiene-styrene-copolymers, homo- or copolymers of unsaturated monomers, in particular of the group comprising ethylene, propylene, butylene, isobutylene, isoprene, vinyl acetate, and alkyl(meth)acrylates, in particular chlorosulfonated polyethylenes and polymers containing fluorine, sulfonamide-modified melamines, and cleaned montan waxes;

fibers, for example of plastics or glass;

pigments, for example titanium dioxide or iron oxides;

accelerators which accelerate the reaction between amino groups and epoxy groups, for example, acids or compounds that can be hydrolyzed to acids, for example organic carboxylic acids such as acetic acid, benzoic acid, salicylic acid, 2-nitrobenzoic acid, lactic acid, organic sulfonic acids such as methanesulfonic acid, p-toluenesulfonic acid, or 4-dodecylbenzenesulfonic acid, sulfonic acid esters, other organic or inorganic acids such as, for example, phosphoric acid, or mixtures of the aforementioned acids and acid esters; further tertiary amines such as 1,4-diazabicyclo[2.2.2]octane, benzyldimethylamine, α-methylbenzyldimethylamine, triethanolamine, dimethylaminopropylamine, salts of such tertiary amines, quaternary ammonium salts such as, for example, benzyltrimethylammonium chloride, phenols, in particular bisphenols, phenol resins and Mannich bases such as, for example, 2-(dimethylaminomethyl)phenol and 2,4,6-tris-(dimethylaminomethyl)phenol, phosphites such as, for example, di- and triphenylphosphites as well as compounds containing mercapto groups which have already been mentioned above;

rheology modifiers such as in particular thickeners, for example sheet silicates such as bentonites, derivatives of castor oil, hydrogenated castor oil, polyamides, polyurethanes, urea compounds, pyrogenic silicic acids, cellulose ethers, and hydrophobically modified polyoxyethylenes;

adhesion promoters, for example, organoalkoxysilanes such as 3-glycidoxypropyltrimethoxysilane, 3-aminopropyltrimethoxysilane, N-(2-aminoethyl)-3-aminopropyltrimethoxysilane, N-(2-aminoethyl)-N'[3-(trimethoxysilyl) propyl]ethylenediamine, 3-ureidopropyltrimethoxysilane, 3-chloropropyltrimethoxysilane, vinyltrimethoxysilane, or the corresponding organosilanes with ethoxy groups or (poly) etheroxy groups instead of methoxy groups;

oxidation, heat, light, and UV radiation stabilizers;

flame retardants, in particular compounds such as alumina ($Al(OH)_3$; also called ATH for "aluminum trihydrate"), magnesium hydroxide ($Mg(OH)_2$; also called MDH for "magnesium dihydrate"), ammonium sulfate (($NH_4)_2SO_4$), boric acid ($B(OH)_3$), zinc borate, melamine borate, and melamine cyanurate; compounds containing phosphorus such as ammonium phosphate (($NH_4)_3PO_4$), ammonium polyphosphate, melamine phosphate, melamine pyrophosphate, triphenyl phosphate, diphenyl cresyl phosphate, tricresyl phosphate, triethyl phosphate, tris-(2-ethylhexyl) phosphate, trioctyl phosphate, mono-, bis-, and tris(isopropylphenyl) phosphate, resorcinolbis(diphenyl phosphate), resorcinol diphosphate oligomer, tetraphenylresorcinol diphosphite, ethylendiamine diphosphate, and bisphenol A bis(diphenyl phosphate); halogen-containing compounds such as chloroalkylphosphates, in particular tris(chloroethyl) phosphate, tris(chloropropyl) phosphate, and tris(dichloroisopropyl) phosphate, polybrominated diphenyl ethers, in particular decabromodiphenyl ether, polybrominated diphenyl oxide, tris[3-bromo-2,2-bis (bromomethyl)propyl] phosphate, tetrabromo bisphenol A, bis(2,3-dibromopropyl ether) of bisphenol A, brominated epoxy resins, ethylene-bis(tetrabromophtalimide), ethylenebis(dibromonorbornanedicarboximide), 1,2-bis-(tribromophenoxy)ethane, tris(2,3-dibromopropyl) isocyanurate, tribromophenol, hexabromocyclododecane, bis(hexachlorocyclopentadieno)cyclooctane, and chloroparaffins; as well as combinations of a halogen-containing compound and antimony trioxide ($Sb_2O_3$), or antimony pentoxide ($Sb_2O_5$);

surfactants such as, for example, wetting agents, flow control agents, deaerating agents or defoaming agents;

biocides, such as, for example, algicides, fungicides or substances that inhibit fungal growth.

It is clear and known to a person skilled in the art which components may be added to the resin component K1 and which may be added to the hardener component K2. Here, in particular, it has to be ensured that the storage stability is not or only slightly impaired by such additional components. Thus, it is clear to a person skilled in the art that a polyamine will react with epoxides in the resin component and can consequently only be a component of the hardener component.

The weight ratio of the epoxy resin component K1 to the hardener component K2 is preferably from 4/1 to 1/1, especially preferably 2/1.

In another aspect the present disclosure pertains to a method for bonding substrates comprising the steps of
i) mixing a two-component epoxy resin composition as defined above;
ii) applying the composition to the surface of a substrate S1, in particular a metal;
iii) contacting the applied epoxy resin composition with the surface of another substrate S2, in particular a metal; and
iv) curing the epoxy resin composition at a temperature of or below 100° C., preferably of from 10 to 40° C.

In its application as an adhesive, the composition is applied to a substrate S1 and/or a substrate S2. The adhesive may therefore be applied to one substrate or the other or to both substrates. Thereafter the parts to be bonded are joined, whereupon the adhesive cures. Here it should be ensured that the joining of the parts takes place within the time known as the open time, in order to ensure that both adherends are reliably bonded to one another.

The adhesive or sealant is preferably applied evenly.

In both applications the substrate S1 may be the same as or different from substrate S2.

Examples of suitable substrates S1 or S2 are inorganic substrates such as glass, glass ceramic, concrete, mortar, brick, tile, plaster, and natural stones such as granite or marble; in particular metals or alloys such as aluminum, steel, nonferrous metals, galvanized metals; organic substrates such as wood, plastics such as PVC, polycarbonates, PMMA, polyesters, epoxy resins, glass fiber reinforced plastics (GFRP), carbon fiber reinforced plastics (CFRP); coated substrates such as powder-coated metals or alloys; and also paints and finishes, more particularly automotive topcoats.

It has been shown that the two-component epoxy resin compositions adhere well especially to electrogalvanized steel and result in an increased impact strength.

It is important to realize that the impact strength modifiers according to the disclosure are effective not only when cured at elevated temperatures, but that they also result in an increase of the impact strength when cured at room temperature. This is in no way obvious since, on the one hand, the development of impact strength is often explained by a phase separation during curing and, on the other hand, this phase separation is temperature-dependent.

The described impact strength modifiers allow to formulate epoxy resin compositions which typically have fracture energies, measured according to ISO 11343, of greater than 8.0 J at 23° C. and greater than 5.5 J at 0° C. Compositions can be typically formulated which have fracture energies of from 9.5 J to 12 J at 23° C. and from 6 to 9 J at 0° C.

Moreover, resistances to fracture (impact peel), measured according to ISO 11343, of greater than 20 N/mm at 23° C. and greater than 15 N/m at 0° C. can be realized. Compositions can be typically formulated which have resistances to fracture of from 26 to 30 N at 23° C. and from 18 to 25 N at 0° C.

If necessary, the substrates can be pretreated before the application of the adhesive or sealant. Such pretreatments comprise, in particular, physical and/or chemical cleaning methods, for example grinding, sandblasting, brushing or the like or treatment with cleaning agents or solvents or the application of an adhesion promoter, an adhesion-promoting solution or a primer.

After the substrates S1 and S2 have been bonded or sealed by means of a composition according to the disclosure, a bonded article is obtained. An article of this kind may be a built structure, more particularly a built structure in construction or civil engineering, or a means of transport. Preferably, the article is a means of transport, for example, a water or land vehicle, in particular an automobile, a bus, a truck, a train or a ship, or a component for installation thereof. Especially preferred the bonded article is a means of transport, in particular an automobile, or a component for installation of a means of transport, in particular of an automobile.

If the composition is used as adhesive for elastic bonds in vehicle manufacturing, it has preferably a pasty consistency with structurally viscous properties. Such an adhesive is applied to the substrate by means of a suitable device, preferably in the form of a bead having a substantially round or triangular cross-sectional area. Suitable methods for applying the adhesive are, for example, the application from commercially available cartridges which can be operated manually or by compressed air, or from a barrel or hobbock by means of a feed pump or an extruder, optionally by means of an application robot. An adhesive with good application properties has a high stability under load and a low stringiness. That means that it remains in the applied form after application, that is, it does not flow and does not draw a thread or only a very short thread, thus avoiding soiling of the substrate.

In vehicle manufacturing, bonds are made by, e.g., bonding parts such as plastic covers, trims, flanges, bumpers, driver's cabs or other attachments to the painted body of a means of transport or the bonding of panes to the body. As vehicles, automobiles, trucks, buses, rail vehicles and ships are mentioned.

In a exemplary embodiment the two-component epoxy resin composition defined above is used as two-component repair adhesive in vehicle manufacturing.

In another aspect, the present disclosure provides a bonded article which is obtained by a method described above and which is in particular a vehicle or an accessory of a vehicle.

EXAMPLES

A few examples are given below which illustrate the disclosure further but do not limit the scope of the disclosure in any way and merely illustrate some of the possible embodiments. Table 2 illustrates the experimental evaluation of the epoxy resin compositions according to the disclosure in comparison with the state of the art.

Methods for Preparing Compositions

The starting materials listed in Table 1 were used in the preparation.

TABLE 1

Starting materials used.

| | |
|---|---|
| D.E.R. ™ 330 (bisphenol A diglycidyl ether = "DER330") | Dow Chemical Company |
| D.E.R. ™ 671 (="DER 671") ("type 1" solid epoxy resin) (EP equivalent weight 475-550 g/eq) | Dow Chemical Company |
| Polypox R7 (tert-butylphenyl glycidyl ether) = "Polypox") | UPPC |
| Poly-THF 2000 (difunctional polybutylene glycol) (OH equivalent weight = approx. 1000 g/OH equivalent) | BASF |
| Liquiflex H (hydroxyl-terminated polybutadiene) (OH equivalent weight = approx. 1230 g/OH equivalent) | Krahn |
| Isophorone diisocyanate (="IPDI") | Evonik |
| Jeffamine ® D-2000 | Huntsman |
| Jeffamine ® D-400 | Huntsman |
| Dynacoll ® 7490 (polyester) | Evonik |
| Dynacoll ® 7250 (polyester, molecular weight 5500 g/mol, Tg = −50° C., hydroxyl value 18-24 mgKOH/g)) | Evonik |
| Hypro ™ 1300X16 Polymer ATBN (="ATBN") | Emerald Performance Material LLC |
| Versamid ® 140 (polyamide, reaction product of dimerized fatty acid/polyamine) | Cognis |

Amino Group Terminated Impact Strength Modifier SM1

200 g of Poly-THF 2000, 48.18 g of IPDI, and 0.03 g of dibutyltin dilaurate are weighed into a vessel and heated under vacuum to 80° C. After approx. 120 minutes an NCO content of 3.5% is determined. Subsequently, the formed prepolymer P-1 is allowed to cool under vacuum for 60 minutes (to 25° C.). 234.60 g of Jeffamine® D-2000 is added, and 70 g of prepolymer P-1 is slowly added with stirring under nitrogen. The reaction is allowed to proceed for 60 minutes to produce the amino group terminated impact strength modifier SM1. The ratio of NCO groups to $NH_2$ groups is 0.248.

Amino Group Terminated Impact Strength Modifier SM2

80 g of Poly-THF 2000, 35.18 g of IPDI, and 0.03 g of dibutyltin dilaurate as well as 80.0 g of Liquiflex H are weighed into a vessel and heated under vacuum to 80° C. After 120 minutes an NCO content of 3.5% is determined. The contents are stirred under vacuum at 80° C. for 90 minutes and subsequently cooled down to 50° C. in 60 minutes (=prepolymer P-2). 233.20 g of Jeffamine® D-2000 is added to a second reaction vessel and 35 g of the prepolymer P-2, which in the meantime has cooled down to 35° C. in the first reaction vessel, is slowly added with stirring. The reaction is allowed to proceed for 60 minutes to produce the amino group terminated impact strength modifier SM2. The ratio of NCO groups to $NH_2$ groups is 0.125.

Amino Group Terminated Impact Strength Modifier SM3

50 g of Poly-THF 2000, 33.93 g of IPDI, and 0.02 g of dibutyltin dilaurate are weighed into a vessel and heated under vacuum to 80° C. After approx. 60 minutes an NCO content of 4.11% is determined. Thereafter 1 g of trimethylolpropane is added and allowed to react under vacuum for another 75 minutes. At that time, an NCO content of 2.60% is measured. In the next step, 8.70 g of hydroxyethyl acrylate (containing 0.1% of hydroquinone) are weighed out and added to the above reaction mixture at 70° C. After stirring for 3 hours at this temperature under vacuum, the so-formed prepolymer P-3 has a measured NCO content of 0.55%. Finally, 200.30 g of Jeffamine® D-2000 is added to a second reaction vessel, and 40 g of the prepolymer P-3, which in the meantime has cooled down to 35° C. in the first reaction vessel, is slowly (within 60 minutes) added with stirring under nitrogen. The reaction is allowed to proceed for 60 minutes to produce the amino group terminated impact strength modifier SM3.

Amino Group Terminated Impact Strength Modifier SM4

150 g of Poly-THF 2000, 33.93 g of IPDI, and 0.02 g of dibutyltin dilaurate are weighed into a vessel and heated under vacuum to 80° C. After approx. 60 minutes an NCO content of 4.11% is measured. Then, 1 g of trimethylolpropane is added, the reaction is allowed to proceed for another 75 minutes under vacuum, and a NCO content of 2.60% is measured.

In the next step, 8.70 g of hydroxyethyl acrylate (containing 0.1% of hydroquinone) are weighed out and added to the above reaction mixture at 70° C. After stirring for 3 hours at this temperature under vacuum, the so-formed prepolymer P-4 has a measured NCO content of 0.55%. Finally, 100.1 g of Jeffamine® D400 is added to a second reaction vessel, and 100 g of the prepolymer P-4, which in the meantime has cooled down to 25° C. in the first reaction vessel, is slowly added (within 60 minutes, with stirring). The reaction is allowed to proceed for 60 minutes to produce the amino group terminated impact strength modifier SM4.

Amino Group Terminated Impact Strength Modifier SM5

80.00 g of Poly-THF 2000, 30.53 g of IPDI, and 0.02 g of dibutyltin dilaurate as well as 80 g of Dynacoll® 7250 are weighed into a vessel and heated under vacuum to 80° C. The NCO content is determined after approximately 120 minutes (3.00%). The thus-formed polymer P-5 is allowed to cool down to 20° C. in 60 minutes. Finally, 201.20 g of Jeffamine® D-2000 is added to a second reaction vessel, and 35 g of the prepolymer P-5, which in the meantime has cooled down to 25° C. in the first reaction vessel, is slowly added (within 60 minutes, with stirring). The reaction is allowed to proceed for 60 minutes to produce the amino group terminated impact strength modifier SM5. The ratio of NCO groups to $NH_2$ groups is 0.063.

Amino Group Terminated Impact Strength Modifier SM6

210.0 g of Dynacoll® 7490, 27.81 g of IPDI, and 0.03 g of dibutyltin dilaurate are weighed into a vessel and heated under vacuum to 80° C. The NCO content is determined after 120 minutes (2.60%) (=prepolymer P-6). Finally, 146.20 g of Jeffamine® D-2000 is added to a second reaction vessel, and 40 g of the prepolymer P-6, which in the meantime has cooled down to 25° C. in the first reaction vessel, is slowly added (within 60 minutes, with stirring). The reaction is allowed to proceed for 60 minutes to produce the amino group terminated impact strength modifier SM6. The ratio of NCO groups to $NH_2$ groups is 0.085.

Amino Group Terminated Impact Strength Modifier SM7

220 g of Acclaim® 4200N, 27.4 g of IPDI and 0.01 g dibutyltin dilaurate are weighed into a vessel and heated under vacuum. After approx. 2 hours an NCO content of 2.25% is measured. The thus-formed polymer P-7 (=(=prepolymer P-7) is cooled down to 20° C. Finally, 69.8 g of Jeffamin-D400 tert. butyl acrylate, the reaction product of Jeffamine®D-400 and tert. butyl acrylate, ratio 1:0.8) is added to a second vessel and 40 g of the prepolymer P-7 is slowly added (within 60 minutes). The reaction is allowed to proceed for 60 minutes to produce the amino group terminated impact strength modifier SM7.

Preparation of the Impact Strength Modifier C3-1

150 g of Poly-THF®2000 (OH value 57 mg/g KOH, BASF) and 150 g Liquiflex H(OH value 46 mg/g KOH, Krahn) were dried under vacuum at 105° C. for 30 minutes. After lowering the temperature to 90° C., 64.0 g of isophorone diisocyanate and 0.13 g of dibutyltin dilaurate were added. The reaction was continued under vacuum at 90° C. until a constant NCO content of 3.30% was obtained after 2.5 hours (calculated NCO content: 3.38%). Subsequently, 103.0 g of the blocking agent Cardolite® NC-700 (Cardanol, Cardolite) was added. Stirring was continued under vacuum at 105° C. until the NCO content had decreased below 0.1% after 3.5 hours. The thus-formed blocked polyurethane impact strength modifier was designated as C3-1.

The two-component epoxy resin compositions listed in Table 2 were prepared. In Table 2, the numbers stated for components represent parts by weight. The respective resin or hardener components were prepared by adding the respective liquid ingredients to a mixing vessel at 40° C. and subsequently mixing in the solid ingredients at 23° C. and by applying a vacuum. The formed resin or hardener components which had a pasty consistency were filled in tin cans and sealed.

in a weight ratio of 2:1. Comparative example Ref.4 corresponds to a combination of the resin component used for examples 1 to 6 according to the disclosure and a filled hardener component "B1" of the prior art described in WO 2009/025991. Comparative example Ref.5 corresponds to a 2:1 weight ratio combination of the resin component used for examples 1 to 6 according to the disclosure and a filled hardener component adjusted to hardener component "B1" of WO 2009/025991, the hardener component containing a proportion of 30% by weight Versamid which has been disclosed as the upper limit according to claim 1 of WO 2009/025991 for the polyamide (Versamid). Comparative example Ref.6 corresponds to a 2:1 weight ratio combination of the resin component used for examples 1 to 6 according to the disclosure and a filled hardener component adjusted to hardener component "B1" of WO 2009/025991, the hardener component containing a proportion of 10% by weight Versamid which

TABLE 2

Two-component compositions (data in parts by weight). First comp.:second comp. component mixing ratio = 2:1 (w:w).

|  | Ref. 2 | Ref. 3 | Ref. 4 | Ref. 5 | Ref. 6 | 1 | 2 | 3 | 4 | 5 | 6 | 7 |
|---|---|---|---|---|---|---|---|---|---|---|---|---|
| 1. Component |  |  |  |  |  |  |  |  |  |  |  |  |
| DER330 | 67.0 | 67.0 | 56.0 | 56.0 | 56.0 | 56.0 | 56.0 | 56.0 | 56.0 | 56.0 | 56.0 | 56.0 |
| DER671 |  |  | 9.0 | 9.0 | 9.0 | 9.0 | 9.0 | 9.0 | 9.0 | 9.0 | 9.0 | 9.0 |
| C3-1 |  |  | 17.0 | 17.0 | 17.0 | 17.0 | 17.0 | 17.0 | 17.0 | 17.0 | 17.0 | 17.0 |
| Toughener B [1] | 21.0 | 21.0 |  |  |  |  |  |  |  |  |  |  |
| Polypox |  |  | 5.0 | 5.0 | 5.0 | 5.0 | 5.0 | 5.0 | 5.0 | 5.0 | 5.0 | 5.0 |
| Dynasilan A187 [2] | 3.0 | 3.0 |  |  |  |  |  |  |  |  |  |  |
| Epoxysilane |  |  | 0.9 | 0.9 | 0.9 | 0.9 | 0.9 | 0.9 | 0.9 | 0.9 | 0.9 | 0.9 |
| Cardolite ® NC-700 | 0.5 | 0.5 |  |  |  |  |  |  |  |  |  |  |
| Surfactant |  |  | 0.1 | 0.1 | 0.1 | 0.1 | 0.1 | 0.1 | 0.1 | 0.1 | 0.1 | 0.1 |
| Fumed Silica | 4.5 | 4.5 | 3.0 | 3.0 | 3.0 | 3.0 | 3.0 | 3.0 | 3.0 | 3.0 | 3.0 | 3.0 |
| Filler mixture |  |  | 6.0 | 6.0 | 6.0 | 6.0 | 6.0 | 6.0 | 6.0 | 6.0 | 6.0 | 6.0 |
| Talc | 3.6 | 3.6 | 3.0 | 3.0 | 3.0 | 3.0 | 3.0 | 3.0 | 3.0 | 3.0 | 3.0 | 3.0 |
| 2nd component |  |  |  |  |  |  |  |  |  |  |  |  |
| ATBN | 17.0 | 17.0 | 17.0 | 11.8 | 19.0 | 23.5 | 23.5 | 23.5 | 23.5 | 23.5 | 23.5 | 23.5 |
| 4,7,10-trioxatridecane-1,13-diamine | 10.0 | 10.0 | 10.0 | 10.4 | 10.0 | 15.0 | 15.0 | 15.0 | 15.0 | 15.0 | 15.0 | 15.0 |
| Lupasol P [3] | 14.0 | 14.0 | 14.0 | 8.6 | 14.0 |  |  |  |  |  |  |  |
| Lupasol WF [4] |  |  |  |  |  | 10.0 | 10.0 | 10.0 | 10.0 | 10.0 | 10.0 | 10.0 |
| Jeffamine ® D-400 | 22.3 | 22.3 | 22.3 | 15.7 | 24.3 | 5.0 | 5.0 | 5.0 | 5.0 | 5.0 | 5.0 | 5.0 |
| Versamid ® 140 | 14.0 | 14.0 | 14.0 | 30.0 | 10.0 | 7.0 | 7.0 | 7.0 | 7.0 | 7.0 | 7.0 | 7.0 |
| Catalyst [5] | 5.0 | 5.0 | 5.0 | 5.2 | 5.0 | 1.5 | 1.5 | 1.5 | 1.5 | 1.5 | 1.5 | 1.5 |
| SM1 |  |  |  |  |  | 15.0 |  |  |  |  |  |  |
| SM2 |  |  |  |  |  |  | 15.0 |  |  |  |  |  |
| SM3 |  |  |  |  |  |  |  | 15.0 |  |  |  |  |
| SM4 |  |  |  |  |  |  |  |  | 15.0 |  |  |  |
| SM5 |  |  |  |  |  |  |  |  |  | 15.0 |  |  |
| SM6 |  |  |  |  |  |  |  |  |  |  | 15.0 |  |
| SM7 |  |  |  |  |  |  |  |  |  |  |  | 15.0 |
| Pyrogenic silicic acid |  | 5.0 | 5.0 | 5.0 | 5.0 | 5.0 | 5.0 | 5.0 | 5.0 | 5.0 | 5.0 | 5.0 |
| Filler mixture |  | 12.7 | 12.7 | 13.3 | 13.3 | 18.0 | 18.0 | 18.0 | 18.0 | 18.0 | 18.0 | 18.0 |

[1] Toughener B = prepared according to paragraph [0075] in US 2005/0070634 A1;
[2] Dynasilan A187 (epoxysilane, Evonik);
[3] Lupasol P (BASF) = polyethyleneimine, Mw = 750,000 g/mol, 50% in water;
[4] Lupasol WF (BASF) = polyethyleneimine, Mw = 25,000 g/mol;
[5] catalyst = 2,4,6-tris(dimethylaminomethyl)phenol Comparative example Ref.1 illustrates the adhesive Betamate™ 2096 commercially available from Dow Automotive. Comparative example Ref.2 illustrates the prior art example "Adhesive example 1" made of components "A1" and "B1" described in WO 2009/025991. Comparative example Ref.3 corresponds to the state of the art described in an example of WO 2009/025991, according to which component "A1" and a filled hardener component "B1" are mixed has been disclosed as the lower limit according to claim 1 of WO 2009/025991 for the polyamide (Versamid).

Test Methods:

For testing, the respective resin and hardener components of Table 2 were mixed largely homogeneously in a weight ratio of 2:1 using a stirrer and directly applied to the substrate surfaces used for preparing the test pieces.

Tensile Shear Strength (TSS) (DIN EN 1465)

The test pieces were prepared from the example compositions described and with electrogalvanized DC04 steel (eloZn) having dimensions 100×25×1.5 mm. Prior to bonding, the substrate was cleaned with acetone. The adhesion surface area was 25×10 mm with a layer thickness of 0.3 mm. After curing for 7 days at 23° C., the tensile shear strength ($TSS_{7d, RT}$) was measured at a pull rate of 10 mm/min. The results are summarized in Table 3.

Impact/Peel Work (ISO 11343)

The test pieces were prepared from the example compositions described and with electrogalvanized DC04 steel (eloZn) having dimensions 90×20×0.8 mm, where the adhesion surface area was 25×10 mm with a layer thickness of 0.3 mm. They were cured for 7 days at 23° C. The impact/peel work was measured respectively at 23° C. ($FE_{RT}$) and at 0° C. ($FE_{0°C.}$). The impact velocity was 2 m/s. The area under the measurement curve (from 25% to 90%, according to ISO 11343) is given as the fracture energy (FE) ($FE_{RT}$ or $FE_{0°C.}$), respectively, in joules. The impact peel strength values (Impact Peel) were measured according to ISO 11343 at 23° C. ($IP_{RT}$) and at 0° C. ($IP_{0°C.}$).

The results are summarized in table 3.

Results

TABLE 3

| Mechanical properties of the cured compositions. | | | | | | | | | | | | | |
|---|---|---|---|---|---|---|---|---|---|---|---|---|---|
| | Ref. 1 | Ref. 2 | Ref. 3 | Ref. 4 | Ref. 5 | Ref. 6 | 1 | 2 | 3 | 4 | 5 | 6 | 7 |
| $ZSF_{7d, RT}$ [MPa] | 24.0 | 24.8 | 22.5 | 25.4 | 26.0 | 24.8 | 13.0 | 15.4 | 16.1 | 17.8 | 15.5 | 17.1 | 11.7 |
| $FE_{RT}$[J] | 0.9 | 6.5 | 0.7 | 0.5 | 0.5 | 3.6 | 10.9 | 9.9 | 8.6 | 10.2 | 8.7 | 9.9 | 5.84 |
| $IP_{RT}$ [N/mm] | 3.0 | 16.5 | 2.5 | 2.0 | 2.0 | 11.0 | 28.0 | 26.0 | 24.0 | 27.5 | 23.0 | 26.0 | 15 |
| $FE_{0°C.}$[J] | 0.2 | 2.9 | 1.2 | 0.5 | 0.4 | 1.3 | 8.1 | 5.7 | 5.9 | 5.7 | 5.6 | 5.9 | 6.14 |
| $IP_{0°C.}$ [N/mm] | 0.5 | 8.5 | 5.0 | 2.0 | 1.5 | 6.5 | 24.0 | 17.5 | 18.5 | 19.0 | 17.5 | 18.0 | 18 |

Table 3 shows that comparative examples Ref. 1 to Ref.6 have significantly lower impact strengths (fracture energies & impact peel strengths) on electrogalvanized steel compared to compositions 1 to 6 according to the disclosure. Rather, compositions 1 to 6 according to the disclosure have impact peel strength values that are 10 times superior over those of the comparative examples which correspond to compositions of prior art. Although the slight tensile shear strengths are slightly reduced, they still have high and acceptable levels. The results of Table 2 show the favorable influence of the lowered polyamide content in particular in combination with the amino group terminated impact strength modifier.

Even in the compositions according to the disclosure containing fillers, the decrease of the fracture energy and the impact peel strengths (comparison between Ref. 2 and Ref.3) caused by the use of fillers can be more than compensated (comparison between 1 and Ref.2).

The compositions according to the disclosure show a distinct increase of the fracture energies due to their increased flexibility. Thus, the adhesive joints do not become brittle even under higher impact loads, but they have a flexibility sufficient to completely maintain their bond integrity. However, the flexibility of the comparative examples is considerably lower, so that the adhesive joint will break already at lower stresses.

Hence, the impact strength modifiers according to the disclosure and the epoxy resin compounds containing the same are in particular suitable for vehicle manufacturing where adhesive joints are required to maintain their integrity even under high mechanical loads, e.g., in the event of an accident.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A two-component epoxy resin composition comprising one epoxy resin component K1 comprising at least one epoxy resin A that contains on average more than one epoxy group per molecule;
and
one hardener component K2 comprising between 1 and 10% by weight, based on the total weight of the hardener component, of an amino group-terminated polyamide B;

wherein at least one of the components K1 and K2 further comprises at least one impact strength modifier C, wherein the composition comprises as the impact strength modifier C an amino group terminated impact strength modifier C1 prepared by reacting a polyurethane prepolymer having isocyanate groups, a primary diamine and optionally at least one Michael acceptor, wherein the polyurethane prepolymer having isocyanate groups is prepared from at least one polyisocyanate and at least one polyester or polyether polyol having at least two hydroxyl groups, and is a component of the hardener component K2, in an amount of from 1 to 30% by weight, based on the weight of the hardener component K2.

2. The two-component epoxy resin composition according to claim 1, wherein the amino group terminated impact strength modifier C1 has the formula (II)

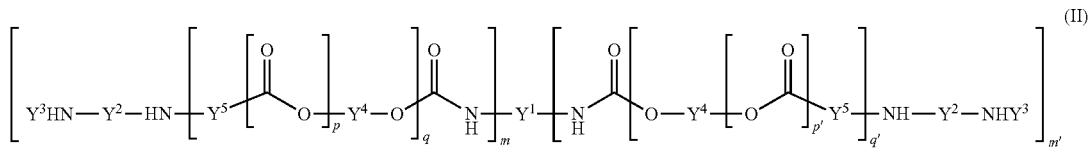

(II)

wherein $Y^1$ is a linear or branched polyurethane prepolymer terminated with m+m' isocyanate groups, after removal of all terminal isocyanate groups;

$Y^2$ is a divalent group of a polyoxyalkylene having $C_2$-$C_6$ alkylene groups, a polybutadiene, a butadiene/acrylonitrile copolymer or a synthetic rubber;

$Y^3$ independently of one another is H or an alkyl group having from 1 to 10 carbon atoms or a moiety of the formula (III),

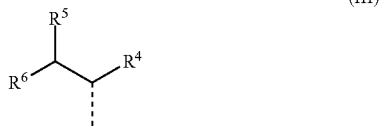

(III)

wherein $R^4$ is a hydrogen atom or a moiety selected from the group consisting of $R^7$, —COOR$^7$, and —CN, and $R^5$ is a moiety selected from the group consisting of COOR$^7$, CONH$_2$, CONHR$^7$, CONR$^7_2$, CN, NO$_2$, PO(OR$^7$)$_2$, SO$_2$R$^7$, and SO$_2$OR$^7$, and $R^6$ is a hydrogen atom or a moiety selected from the group consisting of —R$^7$, —COOR$^7$, —CH$_2$COOR$^7$, and —CN, wherein $R^7$ is a univalent hydrocarbon moiety having from 1 to 20 carbon atoms;

$Y^4$ is an alkylene group having from 1 to 6 carbon atoms or provided that p and p'=0 is nothing; and $Y^5$ is a divalent moiety of the formula (IV) or (IV');

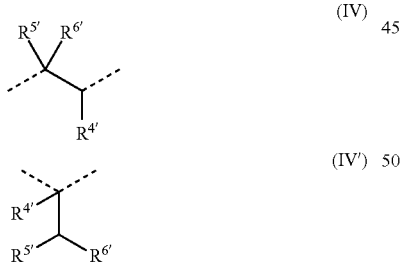

(IV)

(IV')

wherein $R^{4'}$ is a hydrogen atom or a moiety selected from the group consisting of $R^7$, —COOR$^7$, and —CN, and $R^{5'}$ is a moiety selected from the group consisting of COOR$^7$, CONH$_2$, CONHR$^7$, CONR$^7_2$, CN, NO$_2$, PO(OR$^7$)$_2$, SO$_2$R$^7$, and SO$_2$OR$^7$, and $R^{6'}$ is a hydrogen atom or a moiety selected from the group consisting of —R$^7$, —COOR$^7$, —CH$_2$COOR$^7$, and —CN, wherein $R^7$ is a univalent hydrocarbon moiety having from 1 to 20 carbon atoms;

p and p' are each 0 or 1;

q and q' are each 0 or 1;

m and m' are each values of from 0 to 7, provided that m+m' are a value of from 1 to 8.

3. The two-component epoxy resin composition according to claim 2, wherein m and m' are each values of 0 or 1 or 2.

4. The two-component epoxy resin composition according to claim 1, wherein the composition further comprises as the impact strength modifier C a liquid rubber C2 which comprises an epoxy-terminated polymer, and the liquid rubber C2 is a component of the epoxy resin component K1, in an amount of from 1 to 45% by weight, based on the weight of the epoxy resin component K1.

5. The two-component epoxy resin composition according to claim 4, wherein the liquid rubber C2 comprises an epoxy-terminated acrylonitrile/butadiene copolymer.

6. The two-component epoxy resin composition according to claim 1, wherein the composition further comprises as the impact strength modifier C a polymer C3 of the formula (XI)

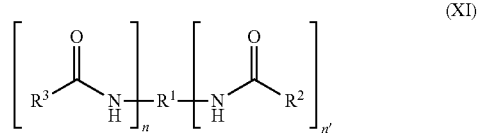

(XI)

wherein $R^1$ is a linear or branched polyurethane prepolymer terminated with n+n' isocyanate groups, after removal of all terminal isocyanate groups;

$R^2$ and $R^3$ each independently of one another are a substituent selected from the group consisting of

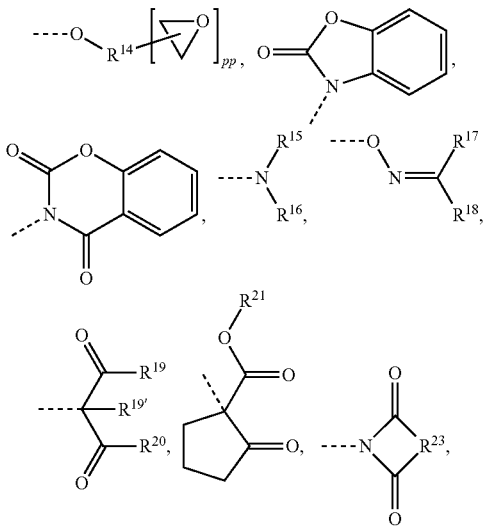

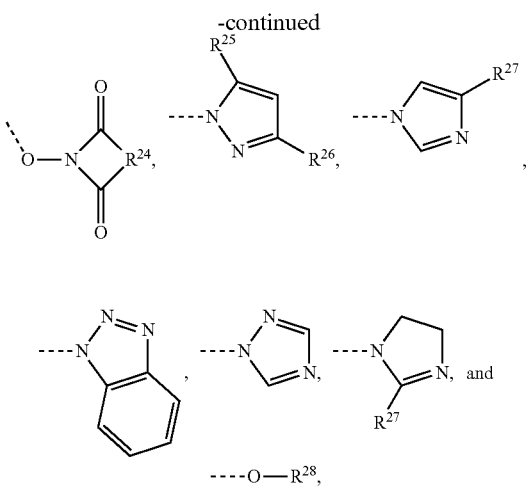

wherein $R^{14}$ is a moiety of an aliphatic, cycloaliphatic, aromatic, or araliphatic epoxy containing a primary or secondary hydroxyl group, after removal of the hydroxy and epoxy groups;

pp represents a value of 1, 2 or 3;

$R^{15}$, $R^{16}$, $R^{17}$, and $R^{18}$ each independently of one another are an alkyl or cycloalkyl or an aralkyl or arylalkyl group;

or $R^{15}$ together with $R^{16}$, or $R^{17}$ together with $R^{18}$ forms a part of an optionally substituted 4- to 7-membered ring;

$R^{19}$, $R^{19'}$, and $R^{20}$ each independently of one another are an alkyl or aralkyl or arylalkyl group or an alkyloxy or aryloxy or aralkyloxy group;

$R^{21}$ is an alkyl group;

$R^{23}$ and $R^{24}$ each independently of one another are an alkylene group having from 2 to 5 C atoms which optionally contains double bonds or is substituted, or are a phenylene group or a hydrogenated phenylene group;

$R^{25}$, $R^{26}$, and $R^{27}$ each independently of one another are H or an alkyl group or an aryl group or an aralkyl group;

$R^{28}$ is an aralkyl group or a mono- or polynuclear substituted or unsubstituted aromatic group which optionally has aromatic hydroxyl groups;

and n and n' independently of one another are each values of from 0 to 7, provided that n+n' is a value of from 1 to 8.

7. The two-component epoxy resin composition according to claim 1, wherein the composition further comprises as the impact strength modifier C an amino group terminated acrylonitrile/butadiene copolymer C4 and the amino group terminated acrylonitrile/butadiene copolymer C4 is a component of the hardener component K2, in an amount of from 10 to 40% by weight, based on the weight of the hardener component K2.

8. The two-component epoxy resin composition according to claim 1, wherein the composition comprises as the impact strength modifier C a combination of the amino group terminated impact strength modifier C1 with a liquid rubber C2 and/or a polymer C3 having the formula (XI) and/or an amino group terminated acrylonitrile/butadiene copolymer C4

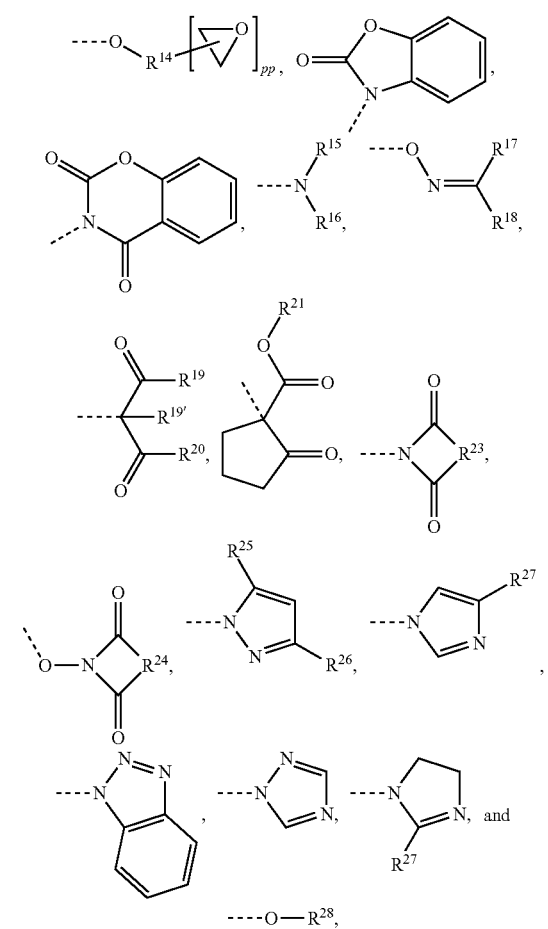

wherein $R^1$ is a linear or branched polyurethane prepolymer terminated with n+n' isocyanate groups, after removal of all terminal isocyanate groups;

$R^2$ and $R^3$ each independently of one another are a substituent selected from the group consisting of wherein $R^{14}$ is in turn a moiety of an aliphatic, cycloaliphatic, aromatic, or araliphatic epoxy containing a primary or secondary hydroxyl group, after removal of the hydroxy and epoxy groups;

pp represents a value of 1, 2 or 3;

$R^{15}$, $R^{16}$, $R^{17}$, and $R^{18}$ each independently of one another are an alkyl or cycloalkyl or an aralkyl or arylalkyl group;

or $R^{15}$ together with $R^{16}$, or $R^{17}$ together with $R^{18}$ forms a part of an optionally substituted 4- to 7-membered ring;

$R^{19}$, $R^{19'}$, and $R^{20}$ each independently of one another are an alkyl or aralkyl or arylalkyl group or an alkyloxy or aryloxy or aralkyloxy group;

$R^{21}$ is an alkyl group;

$R^{23}$ and $R^{24}$ each independently of one another are an alkylene group having from 2 to 5 C atoms which optionally contains double bonds or is substituted, or are a phenylene group or a hydrogenated phenylene group;

$R^{25}$, $R^{26}$, and $R^{27}$ each independently of one another are H or an alkyl group or an aryl group or an aralkyl group;

$R^{28}$ is an aralkyl group or a mono- or polynuclear substituted or unsubstituted aromatic group which optionally has aromatic hydroxyl groups;

and n and n' independently of one another are each values of from 0 to 7, provided that n+n' is a value of from 1 to 8.

9. The two-component epoxy resin composition according to claim 8, wherein the weight sum of the amino group terminated impact strength modifier C1, the liquid rubber C2, the polymer C3, and the amino group terminated acrylonitrile/butadiene copolymer C4 existing in the respective components (K1 and K2) is not more than 80% by weight, based on the weight of the respective component (K1 and K2).

10. The two-component epoxy resin composition according to claim 9, wherein the weight sum of the amino group terminated impact strength modifier C1, the liquid rubber C2, the polymer C3, and the amino group terminated acrylonitrile/butadiene copolymer C4 existing in the respective components (K1 and K2) is not more than 50% by weight, based on the weight of the respective component (K1 and K2).

11. The two-component epoxy resin composition according to claim 1, wherein the hardener component K2 further comprises up to 20% by weight, based on the total weight of the hardener component, poly(ethyleneimine).

12. The two-component epoxy resin composition according to claim 1, wherein the composition further comprises at least one filler F, in an amount of from 3-50% by weight, based on the weight of the composition.

13. The two-component epoxy resin composition according to claim 1, wherein the weight ratio of the epoxy resin component K1 to the hardener component K2 is from 4/1 to 1/1.

14. The two-component epoxy resin composition according to claim 1, wherein the amino group-terminated polyamide B is the reaction product of a dimerized fatty acid and a polyamine.

15. A method for bonding substrates comprising the steps of
i) mixing a two-component epoxy resin composition according to claim 1;
ii) applying the composition to a surface of a substrate S1;
iii) contacting the applied epoxy resin composition with a surface of another substrate S2; and
iv) curing the epoxy resin composition at a temperature of or below 140° C.

16. A bonded article which is obtained by a method according to claim 15 and is a vehicle or an accessory of a vehicle.

17. The method according to claim 15, wherein the substrate S1 and/or the substrate S2 is a metal.

18. A two-component repair adhesive in vehicle manufacturing, wherein the two-component repair adhesive comprises a two-component epoxy resin composition according to claim 1.

19. The two-component epoxy resin composition according to claim 1, wherein the hardener component K2 comprises between 4 and 8% by weight, based on the total weight of the hardener component, of the amino group-terminated polyamide B.

* * * * *